United States Patent [19]

Obermeyer

[11] Patent Number: 4,804,855
[45] Date of Patent: Feb. 14, 1989

[54] HYDROMOTIVE MACHINE APPARATUS AND METHOD OF CONSTRUCTING THE SAME

[76] Inventor: Henry K. Obermeyer, 36 Wickhams Fancy, Rivers Edge Rd., Collinsville, Conn. 06022

[21] Appl. No.: 76,044

[22] Filed: Jul. 21, 1987

Related U.S. Application Data

[63] Continuation-in-part of Ser. No. 14,440, Feb. 13, 1987, Pat. No. 4,755,690.

[51] Int. Cl.⁴ .............................................. F03B 13/10
[52] U.S. Cl. ........................................ 290/54; 290/43
[58] Field of Search ................ 290/43, 52, 54; 405/78

[56] References Cited

U.S. PATENT DOCUMENTS

| | | | |
|---|---|---|---|
| 4,165,467 | 8/1979 | Atencio | 290/52 |
| 4,207,015 | 6/1980 | Atencio | 290/52 X |
| 4,289,971 | 9/1981 | Ueda | 290/52 |
| 4,319,142 | 3/1982 | Mayo, Jr. | 290/52 |
| 4,447,739 | 5/1984 | Ferguson et al. | 290/52 |
| 4,468,153 | 8/1984 | Gutierrez et al. | 290/52 X |

Primary Examiner—William M. Shoop, Jr.
Assistant Examiner—W. E. Duncanson, Jr.
Attorney, Agent, or Firm—Victor E. Libert

[57] ABSTRACT

A hydromotive machine apparatus comprises a bulkhead assembly comprised of an array of water tubes connected to each other with their longitudinal axes in parallel to provide the bulkhead as a relatively light and strong, truss-like integral unit providing a plurality of water flow paths through it. A plurality of submersible hydraulic electromotive machines, which may be generators and/or pumps, is mounted on the bulkhead assembly with runners of the machines disposed within respective water flow paths provided by the water tubes. The apparatus may include a trash screen mounted thereon, and/or valves associated with the water tubes to control the flow of water therethrough. The apparatus may be installed in a hydroelectic power installation by assembling it at a site remote from the water course operating site, for example, at an elevated position above the water level, and moving the apparatus, or at least the bulkhead assembly, as a unit to a submerged, operating position within a water course or passageway.

49 Claims, 14 Drawing Sheets

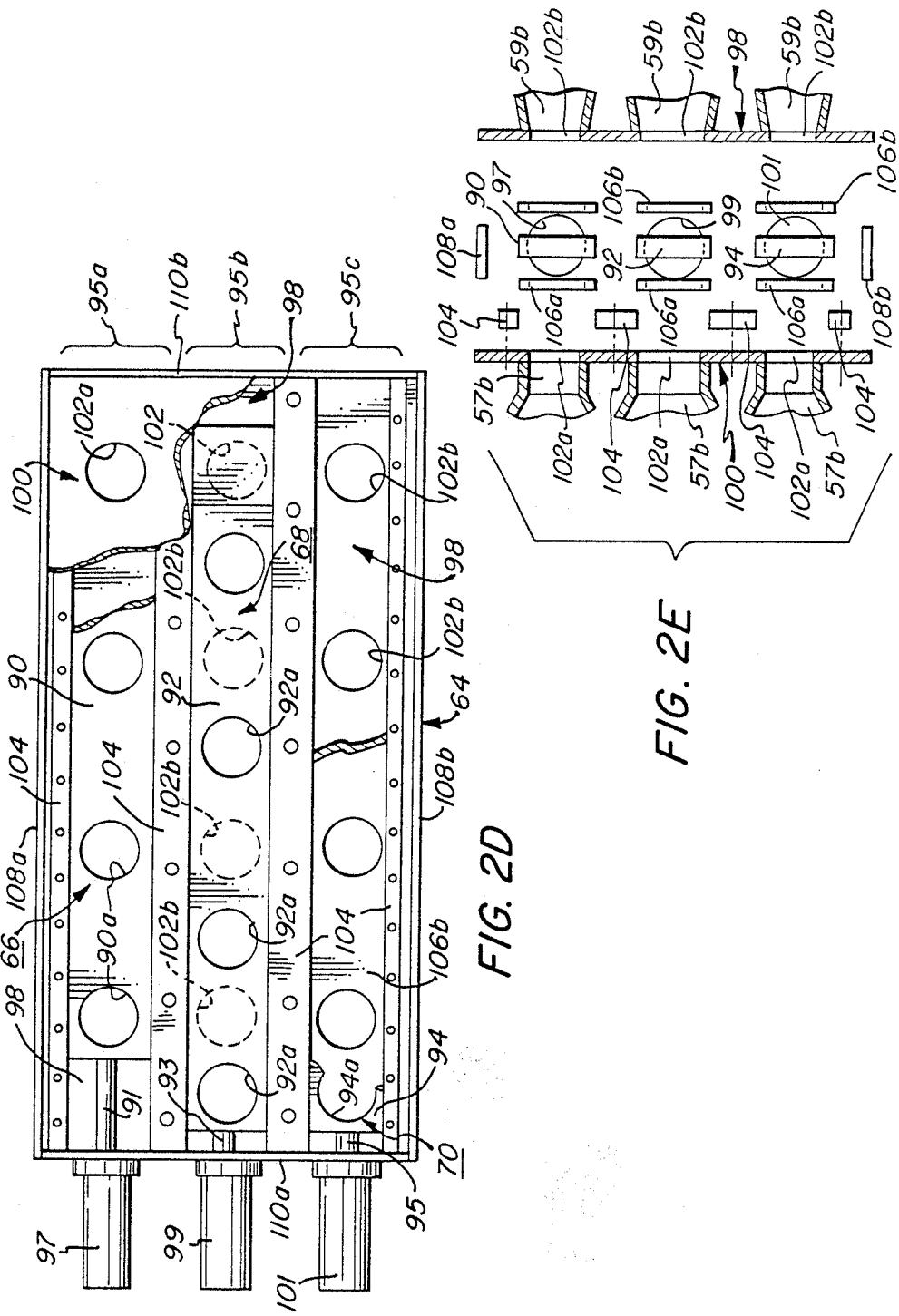

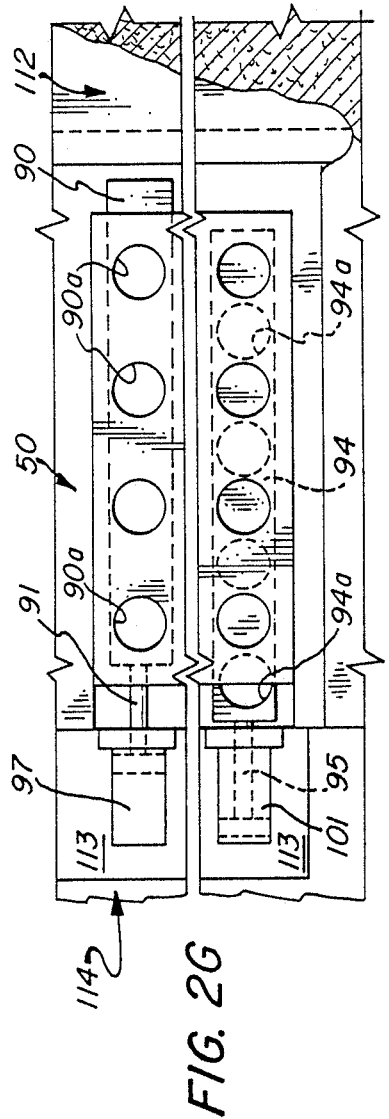
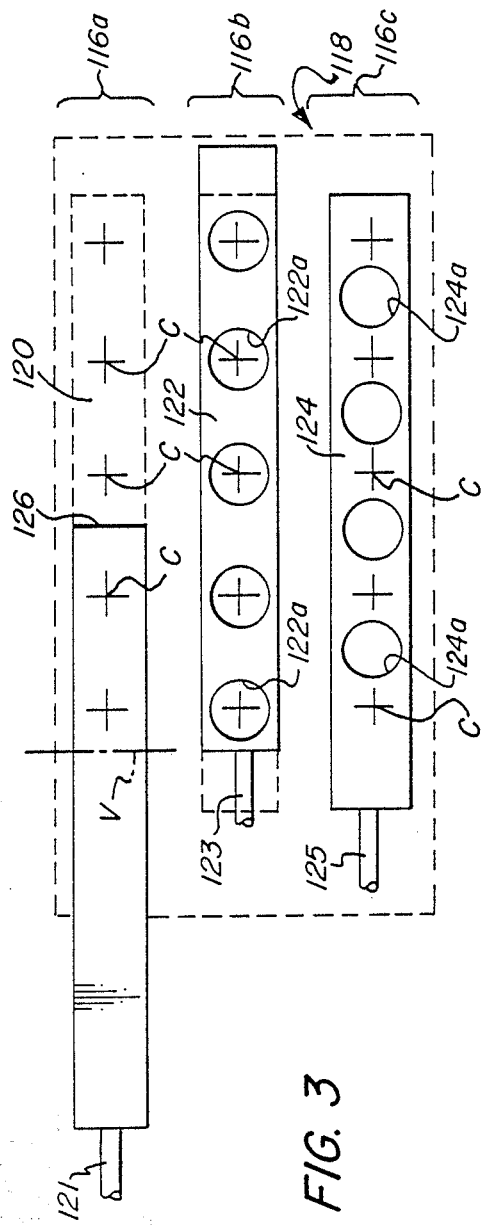
FIG. 2G
FIG. 3

HYDROMOTIVE MACHINE APPARATUS AND METHOD OF CONSTRUCTING THE SAME

CROSS-REFERENCE TO RELATED APPLICATION

This application is a continuation-in-part of application Ser. No. 014,440 entitled "Hydroelectric Power Installation and Turbine Generator Apparatus Therefor" filed Feb. 13, 1987 in the name of Henry K. Obermeyer now U.S. Pat. No. 4,755,690.

BACKGROUND OF THE INVENTION

1. Field of the Invention

The present invention relates to hydromotive machine apparatus and to methods of making the same, such as turbine generator sets for hydroelectric power installations and pump systems used for irrigation or other pumped transport of large quantities of water. The hydromotive machines of the invention may comprise hydroelectric turbine generators or pumps employed to pump water for irrigation, water supply or other purposes.

2. Description of Related Art

The construction of hydromotive machine installations is usually carried out by installing hydromotive machines within a structure specifically designed and built for the purpose, usually a concrete structure such as a dam having one or more suitable spillways or water tunnels formed therein, or gates or locks specifically constructed for the purpose. Generally, a contractor builds a powerhouse downstream of a dam site and then assembles one or more turbine generator sets in place by installing the individual turbines and generator components in the powerhouse at a water course location that is below head water level, such as a discharge tunnel or tunnels under the dam.

Such construction techniques obviously entail the time and expense of building a powerhouse and providing a suitable water delivery conduit, but permit installation of one or more large turbine generator sets. Servicing of a large generator set or sets presents access problems however, and may require significant disassembly of the set. Delays in repair under these circumstances can be lengthy and require an extended shutdown period. Further, the size and weight of large turbine generator sets may be so great that transportation of the entire set is not possible. It is thus often necessary to disassemble the sets into subassemblies for handling and, if necessary, transport. Even lifting of the generator set or its components may be impossible without designing and building new support structures on which a crane may be positioned. Such disadvantages may be overcome by the utilization of smaller generator sets.

Permanent hydroelectric power installations utilizing turbine generator sets which are small enough to be lowered into and raised from their operating position for installation, manufacture and repair are known. For example, U.S. Pat. Nos. 4,143,990 and 4,207,015 to F. J. G. Atencio disclose different versions of moveable hydroelectric generator sets with a dam and U.S. Pat. No. 4,289,971 to Ueda discloses a turbine generator unit which may be raised or lowered for attachment to a fixed draft tube. Such small equipment is obviously limited in generating capacity. Although it is conventional in hydroelectric power installations to provide multiple electric generator sets at a single dam site, this technique is usually employed with large generator sets to justify the large construction costs needed for conventional housing of multiple units. This is so not only in conventional powerhouse installations, but also in tidal power generating installations such as the arrangement described in the article "Tidal Power Engineering In The U.S.S.R." by L. Bernstein appearing at pages 37–41 of *Waterpower & Dam Construction,* March, 1986.

U.S. Pat. No. 4,319,142 to H. A. Mayo, Jr. discloses an apparatus comprising a fabricated steel passageway comprising a single horizontal tier of three S-shaped water tubes joined together in a framework and positioned at the spillway of a dam beneath lifting hoists. Each water tube has a non-submersible turbine generator associated with it. Turbine runners positioned within the S-shaped water tubes are connected by horizontally extending shafts to generators or other machines mounted above the water course on a framework carried by the tube assembly. The entire unitary framework of water tubes with the machines mounted thereon may be raised by the hoists during flood conditions to prevent or reduce the impedance to water flow presented by the water tubes.

SUMMARY OF THE INVENTION

In accordance with the present invention, there is provided a hydromotive machine apparatus comprised of the following components. A bulkhead assembly has a distributor section defining an upstream face and a draft section defining a downstream face and is comprised of an array of water tubes having their longitudinal axes disposed in parallel and being connected to each other to provide a truss structure and define a plurality of water flow paths extending from the upstream face to the downstream face. A plurality of submersible hydromotive machines, each machine having a runner rotatably mounted thereon, is mounted on the bulkhead assembly in association with one of the water tubes and with its runner disposed within the water flow path of its associated water tube. The submersible hydromotive machines may be hydroturbine generators or pumps, e.g., electrically powered axial pumps, or reversible generators which can be operated as either generator or pumps. The hydromotive machines may be mounted on the distributor section of the bulkhead assembly.

Another aspect of the invention provides for the water tubes to be joined to each other by two or more longitudinally spaced-apart tie means, at least one of which is in the draft section, to provide the bulkhead assembly as a truss structure in which the water tubes serve as trusses tying the tie means to each other in a related aspect, one of the tie means is at the downstream face of the assembly; in another related aspect one of the tie means is connected to the distributor section and another of the tie means is connected to the draft section.

In accordance with another aspect of the present invention, there is provided a hydromotive apparatus comprising a plurality of water tubes arranged with their longitudinal axes in parallel and connected to each other to provide a plurality of water flow paths in a bulkhead assembly, on which is mounted a plurality of submersible hydromotive machines. The apparatus further includes valve means mounted on the assembly, the valve means including at least one unitary valve member movable between a closed position in which the unitary valve member closes two or more of the water tubes against water flow therethrough, and an open position in which the unitary valve member opens the water tubes to water flow therethrough.

In one aspect of the present invention, the water tubes individually comprise a distributor shroud and a draft tube, the distributor shrouds being connected to each other to define the distributor section of the bulkhead assembly, and the draft tubes being connected to each other to define the draft section of the bulkhead assembly.

Another aspect of the invention provides for the hydromotive machines to be mounted on respective ones of the distributor shrouds. More specifically, the apparatus may include mounting means which detachably affix the machines to the bulkhead and are accessible from the upstream face of the bulkhead whereby individual ones of the machines may be removed intact from the bulkhead and replaced thereon from the upstream face thereof.

In accordance with another aspect of the present invention the bulkhead assembly is comprised of a unitary draft module comprising a plurality of draft tubes joined to each other, with the distributor shrouds affixed to the draft module. For example, the bulkhead assembly may be further comprised of a unitary distributor module comprising a plurality of distributor shrouds joined to each other, with the distributor module being affixed to the draft module.

In accordance with the method aspect of the present invention, there is provided a method of constructing a hydromotive machine apparatus in a water course site having retaining means therein. The apparatus comprises a bulkhead assembly having a plurality of hydromotive machines mounted thereon and the method comprises the following steps. At a fabrication site which is remote from the water course site, the bulkhead assembly is fabricated by connecting to each other a plurality of water tubes with their respective longitudinal axes parallel to each other so that respective opposite longitudinal ends of the water tubes define, respectively, an upstream face and a downstream face, and the water tubes cooperate to define a plurality of water flow paths extending from the upstream face to the downstream face. The bulkhead assembly is then moved from the fabrication site to the water course site and secured to the retaining means. A plurality of hydromotive machines, each machine having a runner rotatably mounted thereon, is mounted on the bulkhead assembly at the upstream face thereof, the machines being mounted with their runners disposed within a respective one of the water flow paths.

In a specific method aspect of the invention, the water tubes individually comprise a distributor shroud and a draft tube and the method further includes connecting a plurality of the draft tubes to each other to provide a draft module. Thereafter, the distributor shrouds are attached to the draft module to provide the bulkhead assembly. In another specific aspect of the invention, the machines are connected to the bulkhead assembly after the bulkhead assembly has been installed in the water course site.

In accordance with another aspect of the present invention, the hydromotive machines of the above-described apparatus are hydraulic turbine generators and the apparatus includes a transmission line electrically connecting a monitored group of said generators to a bus connector means. The transmission lines include circuit breakers which are responsive to the condition of each of the generators of the monitored group and are effective to open the transmission line in response to an electrical or mechanical malfunction of one or more of the generators of the monitored group, for example, an electrical malfunction.

Sensor means, such as electric current sensor means, may connect each of the generators, e.g., the electrical circuit of each of the generators of the monitored group, to the circuit breaker and provide, through suitable means, a control signal to operate the circuit breaker in response to an electrical malfunction in one of the monitored group of generators.

In another aspect of the invention, valve means may be connected to the monitored group of generators and valve control means connected to the valve means to shut off water flow through the monitored group of generators in response to the condition, e.g., the electrical condition, of one or more of the generators of the monitored group. The valve control means may be made responsive to the current sensor means.

Generally, the present invention provides a compact, relatively lightweight array of hydromotive machines, such as an array of hydraulic turbine generator sets, mounted upon a bulkhead assembly comprised of a truss-like structure or assembly of water tubes. The apparatus, or at least the bulkhead assembly thereof, can be readily transported to a suitable site, such as a hydroelectrical power installation, or can be assembled at the site at a convenient construction of fabricating site non-operating position, e.g., at an assembly site above the water level, and then be positioned by conventional equipment in an operating position in a water course for power generation and/or water pumping.

Other aspects of the invention are described in the following detailed description.

The following terms as used in the specification and claims have the indicated meanings.

The term "submersible" used to characterize hydromotive machines means a hydromotive machine which is enclosed within a suitable water-resistant housing so that the entire machine is submerged in water during operation. Bulb-type hydraulic turbine generators are examples of submersible hydromotive machines.

The term "runner" has its usual art-accepted meaning when applied to hydraulic turbine generators, as meaning the rotatable member which is rotated by moving water to turn the rotor shaft of the machine; when broadly applied herein to refer to pumps, it is deemed to mean and include the pump impeller.

The term "downstream" and "upstream" are used with reference to the direction of water flow through the apparatus of the invention during electrical generation mode of turbine operation, i.e., from the distributor shroud to the draft tube.

BRIEF DESCRIPTION OF THE DRAWINGS

FIG. 1 is a perspective view of a dam having a plurality of water bays within which embodiments of the hydromotive machine apparatus of the present invention (not visible in FIG. 1) are installed;

FIG. 2E is an enlarged partial plan view and with parts broken away, of the apparatus of FIG. 2;

FIG. 6A is an end view in elevation on a reduced scale of a portion of the valve gate of the water tube of FIG. 6, taken from the downstream end of the apparatus of which the water tube is a part;

FIG. 6B is a section view taken along line B—B of FIG. 6A;

DETAILED DESCRIPTION OF THE PREFERRED EMBODIMENTS

Figure 1A:
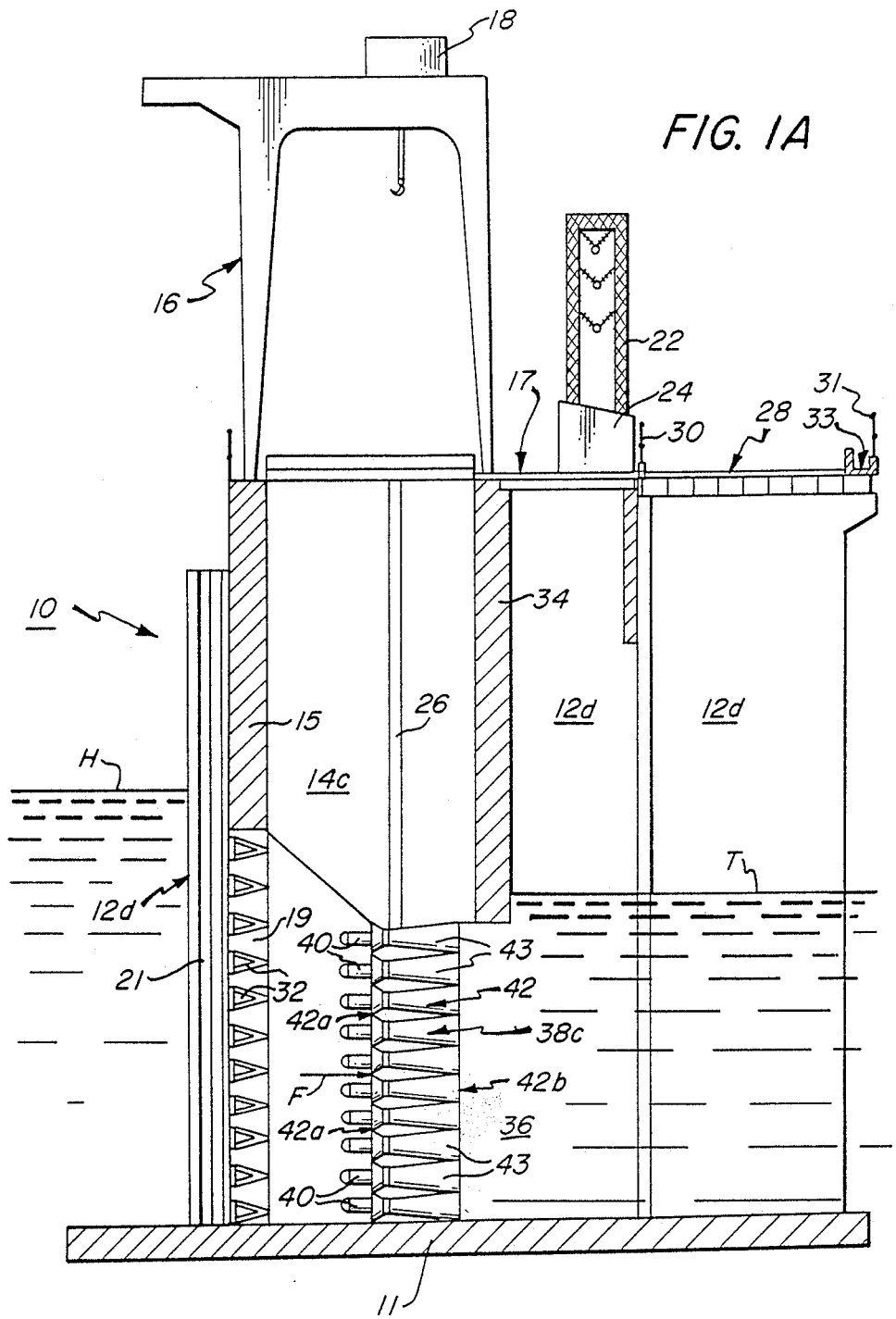
FIG. 1A is a schematic section view, on a scale larger than that of FIG. 1, taken transversely of the dam of FIG. 1, i.e., along a line parallel to the direction of water flow through the dam.

The provision of power installations by assembling a plurality of small generator sets above the water level, or at a remote manufacturing site, onto a suitable structure or structures, and then positioning the structures into an operating position at a dam tunnel or within a suitable gate or lock, has significant appeal from a cost and efficiency standpoint. The components and castings for smaller turbine generator sets can be more readily obtained from a much larger number of suppliers than can those for larger generator sets; the latter may not be available at all except by special order from only a limited number of turbine generator manufacturers, resulting in long lead times and extended completion dates. The smaller turbine generator sets also offer the advantage that they can be installed in a smaller dam or lock structure since, for a given water passageway shape and installed power generating capacity, the length of the turbine is generally proportional to the turbine runner diameter. Smaller turbine generators also significantly decrease the size and therefore the cost of the peripheral equipment and support structures required, as well as providing a higher specific power output per unit weight of turbine (or pump). Thus, lifting cranes and similar support equipment can be scaled down where an array of smaller turbine greater sets are used in place of a single or lesser number of large turbine generator sets producing the same amount of power. Small turbine generator sets are also easily transported by rail or truck while, in some cases, large turbine generator sets must be constructed at the site because their assembled size or weight exceeds the capacity of lifting cranes, vehicles and access roads and bridges. Additionally a hydroelectrical power installation utilizing an array of smaller turbine generator sets also produces long-term economies since individual or sub-groups of the generators can be removed from service for repair or replacement without totally shutting down the power generating facility. However, such individual small turbine generator sets are of course limited in the amount of power they can produce. Further, the construction effort of providing permanent, multi-tunnelled concrete structures to accommodate a plurality of such small generator sets is extremely expensive, such construction effort often not being feasible except in connection with the installation of larger individual turbine generator sets.

Generally, the foregoing advantages of installations using a large number of small generator sets as compared to those using one or a few large generator sets applies equally to pump installations, such as irrigation pump systems using axial pumps.

Generally, the "small" generator sets or other hydromotive machines which are conveniently utilizable in the practices of the present invention have runner diameters not greater than about 40 inches. For example, fixed pitch turbine generator machines considered to be "small" machines and therefore readily utilizable in the practices of the present invention should have runner diameters of not greater than about 36 inches, more preferably, runner diameters from about 6 to 18 inches. For variable pitch machines, the runner diameters should be in the range of from about 12 inches to 40 inches, preferably from about 24 to 36 inches in diameter. Such fixed pitch machines will normally operate at from about 900 to 1800 revolutions per minute ("rpm") although they may operate at speeds up to about 3,600 rpm. Variable pitch runner machines within the indicated size range will normally operate at about 450 to 1200 rpm, preferably at at least about 500 rpm. A small machine with a 6-inch runner diameter may weigh as little as 150 pounds; a small machine with a 26-inch runner diameter, together with its associated distributor shroud, may weigh as much as about 8,000 pounds.

Figure 1C:
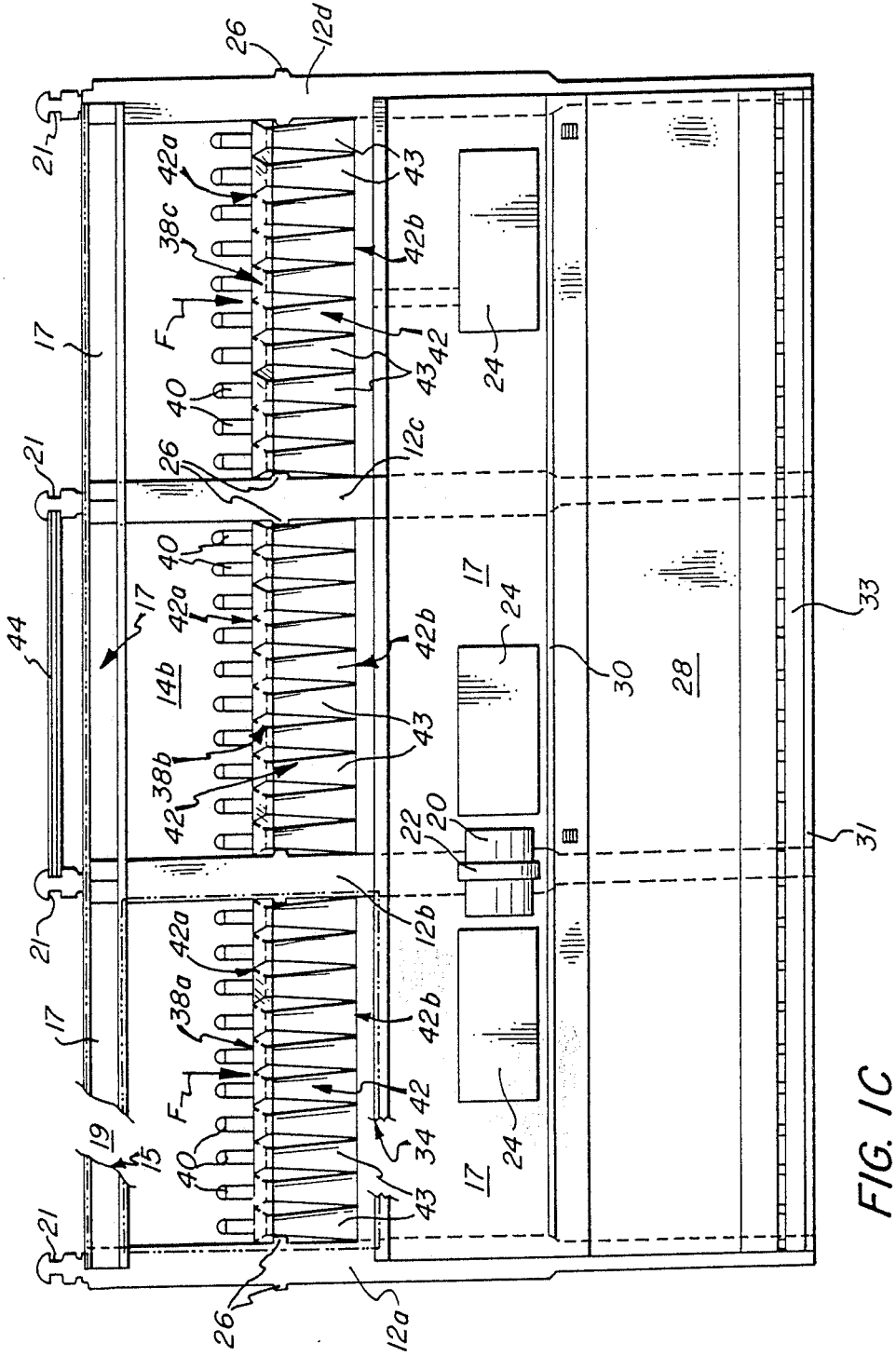
FIG. 1C is a schematic plan view, on a scale larger than that of FIG. 1, of the three water bays shown in FIG. 1B.
Figure 1B:
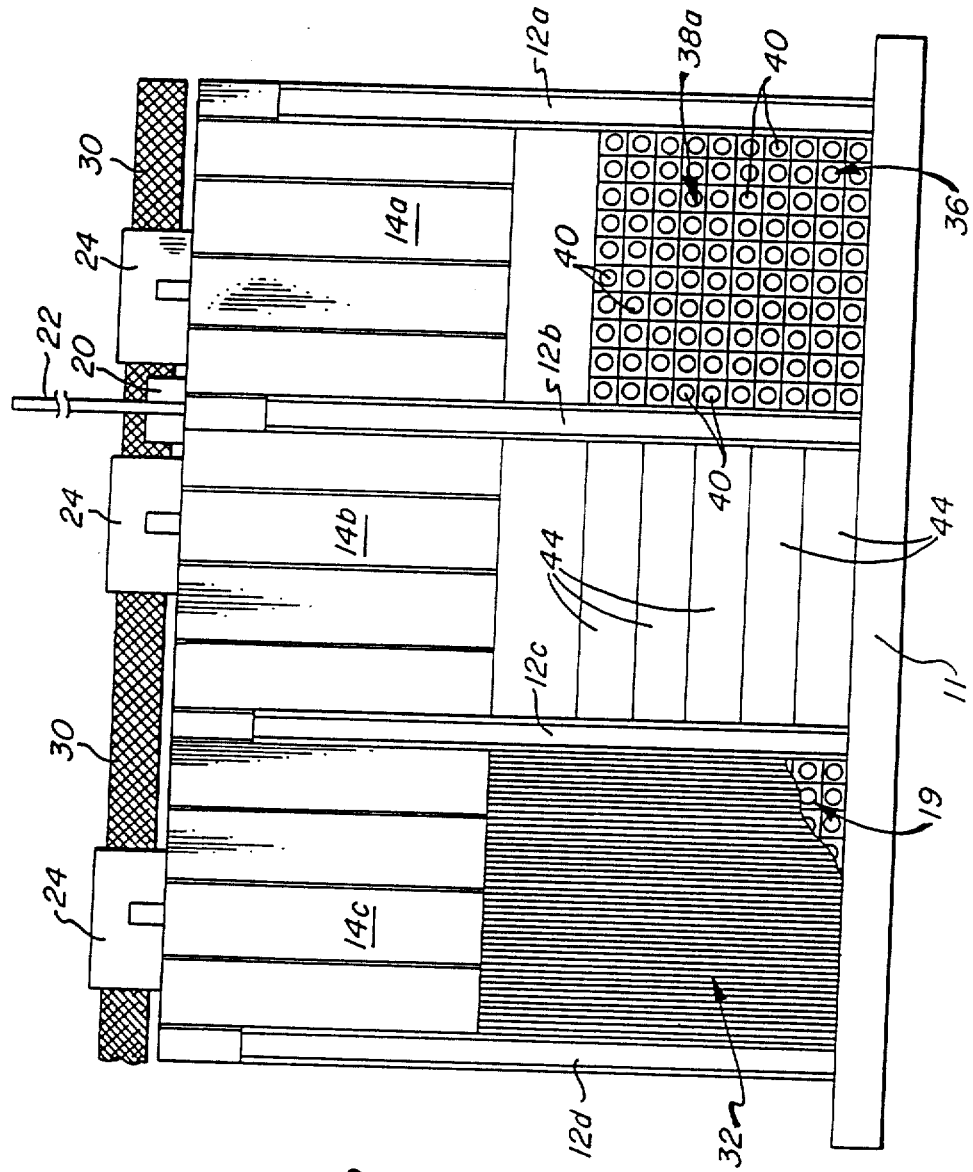
FIG. 1B is a schematic view in elevation on a scale larger than that of FIG. 1 and with some parts omitted, of a three water bay-wide segment of the dam of FIG. 1.

Referring now to FIG. 1, there is shown in perspective view a dam generally indicated at 10 comprising reinforced concrete structure which includes a plurality of piers 12a–12i which define between adjacent pairs thereof a series of eight water bays 14a–14h. As shown in FIGS. 1A and 1B, dam 10 has a footing 11 which is anchored in the bed of the river across which dam 10 extends. The head water level H (FIG. 1A) is the surface of the river upstream of dam 10 and the tail water level T is the surface of the river downstream of dam 10. A transversely extending upstream dam wall 15 extends between opposite banks of the river bridged by the dam 10 and is tied into each of the piers 12a–12i. A deck 17 is supported by the piers 12a, 12b, 12c, etc., providing access across the dam 10 and supporting a track (unnumbered) on which a crane 16 can travel along dam 10 to traverse the water bays 14a–h and a service area 17a. Crane 16 has a hoist means 18 mounted thereon as part thereof. Conventional step-up transformers, typical ones of which are shown at 20 (FIGS. 1 and 1C) are surmounted by transmission line towers 22 on which transmission cables are strung. These and a plurality of switching gear enclosures 24 are supported on the top deck 17 of the dam 10. As best appreciated from FIGS. 1A and 1C, the piers 12a, 12b, 12c, 12d, etc., extend for a length upstream and downstream which is sufficient to support a vehicle roadway 28 and a pedestrian walkway 33 on the downstream section of the piers. As best seen in FIGS. 1A and 1C, fence 30 separates roadway 28 from deck 17 and fence 31 borders pedestrian walkway 33.

Each of piers 12a–12i has vertically extending stop log slots 21 formed therein and arranged (FIG. 1C) so that pairs of such stop log slots face each other across each of the bays 14a, 14b, 14c, etc. Trash screen racks 32 (FIG. 1A) are positioned within rectangular water inlets 19 formed at the lower end of upstream dam wall 15, the trash screen racks 32 serving to protect their associated water bays 14a–14h from flotsam in the river. Each of the bays 14a–14h has a similar water inlet 19 (FIGS. 1A and 1B) similarly equipped with a trash screen rack 32. As shown in FIGS. 1A and 1C, a downstream dam wall 34 extends coextensively with upstream dam wall 15 and has, in each of water bays 14a–14h, a rectangular water passageway 36 formed at the lower end thereof. In each of the water passageways 36 there is mounted a hydromotive machine apparatus comprising, in the illustrated embodiment, a plurality of hydromotive electric generator apparatus units 38a–38h, only three of which (38a, 38b and 38c) are shown in FIG. 1C. Each of units 38a, 38b, 38c, etc., may be similar or identical to each other. In the illustrated embodiments, each of the hydromotive generator apparatus units 38a–38h comprises 100 small, submersible hydraulic generator sets 40 which are mounted upon a bulkhead assembly 42 which is comprised of a plurality of water tubes 43 as described in more detail below.

As best seen in FIG. 1B with reference to water bay 14a and apparatus 38a thereof, which is typical of each apparatus unit 38a–38h, one hundred small, submersible hydraulic generator sets 40, and their associated water tubes 43, are arranged in a rectangular array 10 tiers high, each tier comprising a row of ten generator set/water tube combinations. As explained in more detail below, the submersible generator sets 40, which may comprise bulb turbines, are conventionally mounted upon their associated bulkhead assembly 42, as by being bolted thereon at the upstream face 42a (FIGS. 1A and 1C) thereof. As also described in more detail below, the water tubes 43 are interconnected to provide bulkhead assembly 42 as a truss member capable of resisting the net force imposed upon it by the water pressure differential between the upstream face 42a and the downstream face 42b of bulkhead assembly 42. With this arrangement, individual ones or groups of generator sets 40 may be removed from its or their associated bulkhead assembly 42 for repair and/or replacement of such generator sets.

Water flow through a given water bay may be closed off when it is desired to effectuate such replacement or repair by the known expedient of utilizing stop logs, such as stop logs 44, which may be lowered by means of hoist 18 on crane 16 into the stop log slots 21 of a pair of facing piers, as illustrated by FIGS. 1B and 1C, which show stop logs 44 in place to block water flow through water bay 14b.

As best seen in FIGS. 1A and 1C, protruding vertical lips 26 are formed on opposite sides of each of the piers 12a, 12b, 12c, 12d, etc., and provide a rest or retaining shoulder against which bulkhead assembly 42 is received in order to retain the hydromotive generator apparatus sets 38a, 38b, 38c, etc., in place. The pressure of water acting upon the hydromotive generator apparatus sets will tend to force the latter against the retaining shoulder provided by the vertically extending lips 26. One of the features of the present invention is the mechanical strength of the apparatus, provided by its truss or truss-like construction, which enables it to resist the force of water pressure differential acting on it, as more fully described below. Suitable retaining means such as bolts, linch pins or the like may also be used to help secure bulkhead assembly 42, and thereby the generator units 38a, etc., of which the bulkheads comprise a part, in place.

The bulkhead assembly 42, in accordance with the present invention, provides a mounting means and water tubes for large arrays of individual generator or pump sets, as a truss structure which provides great strength with relatively light weight. Accordingly, bulkhead assemblies for even very large arrays retain their structural integrity under the force of differences in water pressure acting on the bulkhead assembly, including the static pressure head imposed by the difference between the head water and tail water levels. For example, the arrows F in FIGS. 1A and 1C indicate the net force acting on, and resisted by, the bulkhead assemblies 42 in water bays 14a and 14c. Each of the bulkhead units 42 close respective ones of water passageways 36 and thus comprise effective parts of downstream dam wall 34, against which the forces F act. It will be observed from FIG. 1C that the forces F acting on the bulkhead assemblies 42 will place the upstream portions thereof, i.e., at and adjacent upstream faces 42a, under compression and the downstream portions thereof, i.e., at and adjacent downstream faces 42b, under tension. The water tubes 43 act as truss members between the upstream and downstream sections, providing a high strength, relatively low weight construction.

Initial installation of the hydromotive generator apparatus units 38a, 38b, 38c, etc., may be carried out by installing the entire hydromotive generator apparatus unit, or the bulkhead assembly 42 thereof, as a unit. This may conveniently be carried out by use of hoist 18 on crane 16 to transport the units (as used in this context, "units" refers to the hydromotive generator apparatus units 38a, 38b, 38c, etc., or to the bulkhead assembly 42 thereof) into position above the appropriate water bay 14a, 14b, 14c, etc. into which it is to be installed, and lowering the unit into alignment with the associated water passageway 36. To facilitate this maneuver, the vertical lips 26 extend for the entire height of the piers 12a, 12b, 12c, etc., so that they may be utilized as a guide during lowering of the units into place. Naturally, during such operation, the stop logs 44 will be positioned in slots 21 of the bay to prevent the flow of water therethrough. A positive guiding action may be obtained by providing guide means which engage vertical lips 26. For example, pairs of guide wheels may be mounted on the units to engage the upstream and downstream side of lips 26 in order to guide the units into place. Obviously, any other similar suitable guiding arrangement may be used.

Service area 17a of deck 17 provides a convenient location at which the bulkhead assembly 42 of units 38a–38h may be assembled or constructed and, with or without bulb generator sets 40 mounted thereon, the completed bulkhead assemblies are picked up by the hoist 18 of crane 16 and transported to a position above the bay into which it is to be installed, as described above. Service area 17a thus conveniently serves as a fabrication site which is remote from the water course site (passageway 36) into which the assembly is to be installed.

Once the unit 38a, 38b, etc., is installed, the stop logs 44 are removed when it is desired to place the unit in operation and water flows through the units 38a, 38b, etc., to rotate the runners of the generators 40 thereof, and generate electric power thereby. Power conducting lines, switches and numerous other devices well known to those skilled in the art are omitted from the Figures, for simplicity of illustration.

Figure 2:
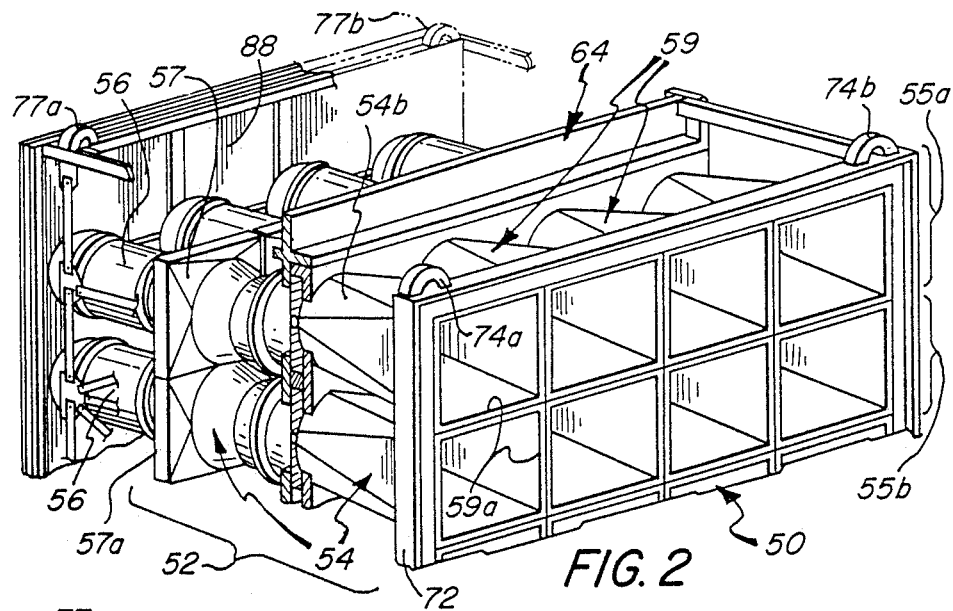
FIG. 2 is a partial perspective view, with parts broken away, of the downstream end of a hydromotive machine apparatus in accordance with another embodiment of the present invention.

Referring now to FIGS. 2–2E inclusively of the drawings, FIG. 2 shows in perspective view, with a portion broken away, a hydromotive machine apparatus 50 in accordance with one embodiment of the invention. Apparatus 50 comprises a bulkhead assembly 52 comprised of a plurality of individual water tubes 54, each of which is comprised of a distributor shroud 57 having an inlet end 57a and a draft tube 59 having a discharge end 59a. The water tubes 54 of bulkhead assembly 52 are arranged in the illustrated embodiment in three tiers 55a, 55b and 55c, each tier being four water tubes wide. The discharge ends 59a of the water tubes 54 are mounted within a discharge tie plate 72 which stiffens and reinforces the downstream face formed by the discharge ends 59a at the downstream end of the bulkhead assembly 52. A pair of lifting eyes 74a, 74b may be attached to the top (as viewed in FIGS. 2–2C) of discharge tie plate 72 to facilitate raising and lowering of the entire apparatus 50 by a crane or the like.

A plurality of submersible hydromotive machines 56, which machines may be pumps or, as illustrated, hydraulic turbine generators, is mounted on the bulkhead assembly 52. As best seen in FIG. 2C, each submersible hydromotive machine or generator 56 is substantially cylindrical in configuration and comprises a stator housing 58 on which a runner 60 (only one of which is shown in FIG. 2C) is mounted. Runner 60 is comprised of a plurality of blades 60′ mounted on a central hub for rotation by water flowing over stator housing 58 and into and through water tubes 54 from inlet ends 57a to discharge ends 59a thereof. The center water tube 54 in FIG. 2C is partially broken away to show the runner 60, as well as two of a plurality of guide vanes 62 which serve as mounting means to mount generators 56 on bulkhead assembly 52 at the upstream side thereof, on respective distributor shrouds 57. The guide vanes 62 also serve to help direct the flow of water onto the runners 60. It will be appreciated that each of generators 56 has identical runners and guide vanes associated with it. It will further be appreciated that conventional power lines for conducting electricity from the generators, control lines, etc., are, as in the other Figures, omitted for simplicity of illustration. As best shown with respect to FIGS. 2, 2B and 2C, the distributor shrouds 57 of adjacent draft tubes 59 contact, and may be fastened to, each other to provide a distributor module and enhance the rigidity and stability of the bulkhead assembly 52. Distributor shrouds 57 are square in cross section at their inlet or upstream ends 57a and are circular in cross section at their opposite, throat area ends 57b (FIGS. 2C and 2E) which are joined to the draft tubes 59 at the throat area (unnumbered) adjacent to runner 60.

Additional support for the structure and additional rigidity may be provided by providing a structural framework connecting machines 56 and water tubes 54, such as the illustrated framework comprising a plurality of vertical support members 76, horizontal support members 78 and diagonal support members 80 which are interconnected by connecting plates 82. Lifting eyes 77a, 77b may be mounted on the resultant structural framework provided by the various support members to cooperate with lifting eyes 74a, 74b to facilitate lifting, transporting and lowering of the entire apparatus 50.

A valve tie plate 64 is positioned just downstream of the juncture of distributor shroud 57 and draft tube 59 of the water tubes 54 and receives and supports the draft tubes 59 to provide additional support and rigidity to the bulkhead assembly 52. In addition, valve tie plate 64 serves to support three valve means 66, 68 and 70 (FIGS. 2C and 2D) and provide a gate passage 96 (FIG. 2F) within which the valve means 66, 68 and 70 are operated to serve, respectively, the upper tier 55a, the center tier 55b and the lower tier 55c of water tubes 54 and their associated machines 56. Discharge tie plate 72 and valve tie plate 64 are typical of "tie means" which are used to connect the water tubes together into a truss structure in accordance with an aspect of the invention. Such "tie means", as the term is used in this specification and in the claims, may also comprise simply welding or otherwise securing abutting sections of adjacent water tubes to each other, or using the rods, bars, plates or other structural members for the purpose, or a combination of such fastening means and techniques.

Each of the water tubes 54 individually comprises a distributor shroud 57 connected for water flow communication with a draft tube 59 which terminates in a discharge end 59a (FIGS. 2C and 2E) and has an opposite, throat end 58b. Discharge ends 59a, like inlet ends 57a, are of generally rectangular, usually square, configuration when viewed in flow cross section, as in FIG. 2A. However, as described below, the discharge ends (and the inlet ends) may be hexagonal or circular in shape. The throat ends or sections 59b of draft tubes 59 are connected in flow communication with shrouds 57 by each being joined to suitable respective openings 102a, 102b (FIGS. 2D and 2E) of valve plate 64, as described below. Throat ends 59b are of circular configuration when viewed in flow cross section, as are the throat sections of distributor shrouds 57.

Figure 2A:
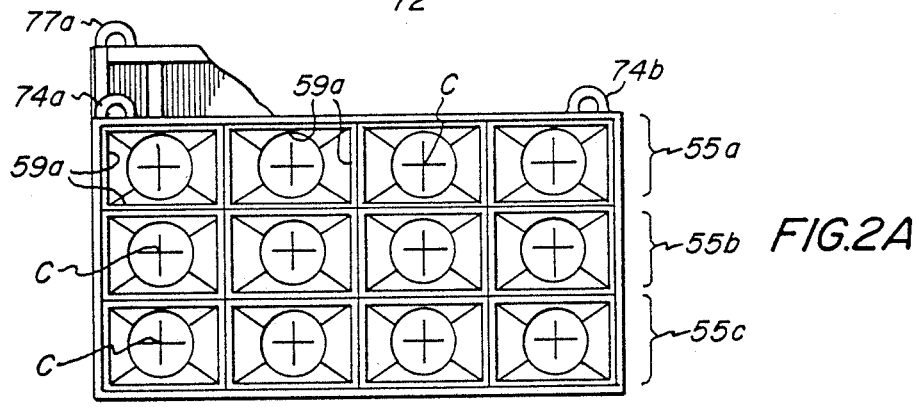
FIG. 2A is a view in elevation of the downstream end of the apparatus of FIG. 2.
Figure 2B:
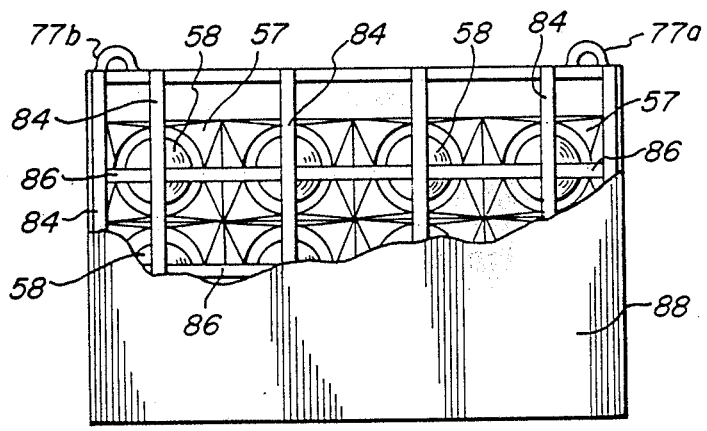
FIG. 2B is a view in elevation, with parts broken away, of the upstream end of the apparatus of FIG. 2.
Figure 2C:
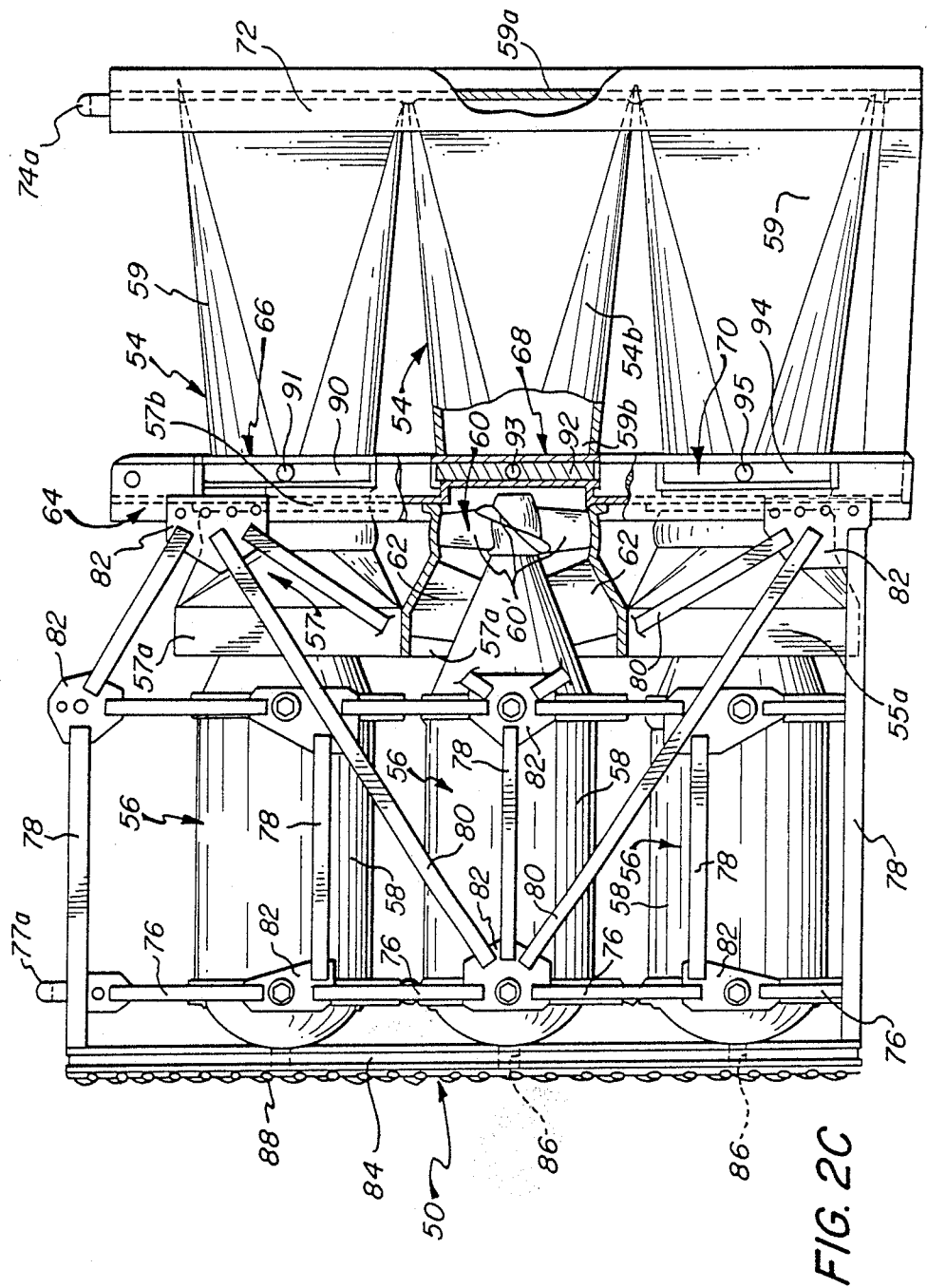
FIG. 2C is a side view in elevation, on an enlarged scale relative to FIGS. 2-2B, of the apparatus of FIG. 2.
Figure 9:
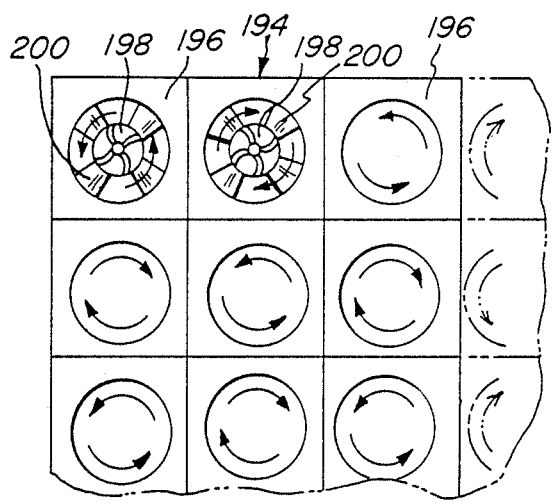
FIG. 9 is a schematic view in end elevation of the discharge end of another embodiment of the present invention showing opposite-rotating discharge eddies.

In FIG. 2A the respective longitudinal center lines of water flow through the water tubes 54 are indicated by the intersection of cross-lines C and it will be noted that the respective water tubes 54 are centered in a rectangular pattern in this embodiment. That is, the intersections of the cross-lines C form a rectangular pattern as seen in water flow cross section at the discharge ends 59a of the water tubes 54. By thus centering the discharge ends in a rectangular pattern, certain advantages, as explained more fully below with respect to FIG. 9, are derived with respect to discharging water from the assembly 52 in co-currently flowing eddies. Water tubes 54 of bulkhead assembly 52 are of the straight-through type, that is, the longitudinal axes of the water tubes 54 are substantially straight lines, as distinguished from S-shaped tubes of the type illustrated, for example, in the above-described Mayo U.S. Pat. No. 4,319,142.

A plurality of vertical screen supports 84 and horizontal screen supports 86 are mounted on the upstream side of the machine stator housings 58 and cooperate to provide a structural support for a trash screen 88 which is affixed thereto. Trash screen 88 provides a foraminous screen-like member of sufficient structural strength to protect the apparatus 50 from floating branches, logs or other flotsam. The relatively close spacing of the upstream ends of the stator housings 58 of hydromotive machines 56 provides ample structural support for the trash screen 88 and permits the utilization of much smaller screen supports 84, 86 than those normally required to support a trash screen, or could even permit their elimination altogether. Because conventional trash screens are self-supporting, their supporting structural members are normally made of heavy I-beam construction to enable the trash screen to resist the considerable force of water pressure which acts on it as the screen becomes clogged. The illustrated embodiment utilizes the structural strength and rigidity provided by the apparatus 50 to support the trash screen 88 thereon.

Valve means 66, 68 and 70 are carried on valve tie plate 64 and their construction and operation is best illustrated with reference jointly to FIGS. 2C and 2G, inclusively. Valve means 66, 68 and 70 (FIGS. 2C, 2D and 2E) each comprise a unitary valve member comprising respective valve gates 90, 92 and 94, each of which is identical in configuration, having four circular gate openings which are equally spaced apart along its length. Thus, gate openings 90a are formed in valve gate 90, gate openings 92a in valve gate 92 and gate opening 94a in valve gate 94. The valve ends of respective gate operating rods 91, 93 and 95 are affixed to the operating ends of valve gates and the opposite ends of the rods are suitably connected to operating mechanisms 97, 99 and 101, which may comprise any suitable means for shifting the operating rods, and thereby the valve gates, along their respective longitudinal axes. The operating mechanisms may comprise hydraulic fluid cylinders within which piston heads (see FIG. 2G) mounted on the opposite ends of the operating rods may be positioned by convention hydraulic circuit control means (not shown).

The construction of valve tie plate 64 is best described with reference to FIG. 2D and exploded FIG. 2E from which it is seen that a distributor weldment plate 98 and a draft weldment plate 100 are each of the same size and of rectangular configuration and each have formed therein a series of 12 circular openings, 102a in plate 100 and 102b in plate 98. A series of spacer bars 104 are riveted, welded or otherwise suitably affixed to weldment plate 98. In the assembled tie plate 64, spacer bars 104 bridge the space between weldment plates 98 and 100 to provide guides or tracks within which valve gates 90, 92 and 94 slide. A series of rectangular liner seals 106a and 106b are attached, respectively, to weldment plates 98 and 100 to provide a low friction bearing surface against which valve gates 90, 92 and 94 slide, as well as mechanical sealing for the valve. The tops and bottoms (as viewed in FIG. 2D) of spacer bars 104 may be lined with the same low friction material to provide a low friction bearing surface for the edges as well as the sides of valve gates 90, 92 and 94. Liner seals 106a and 106b have circular openings formed therein which are the same size as and align with corresponding openings 102a and 102b in, respectively, weldment plates 98, 100. Liner seals 106a and 106b and the top and bottom layers (not shown) of spacer bars 104 are made from any suitable material such as a synthetic, organic polymeric (plastic) material, for example, ultra-high molecular weight polyethylene. Top and bottom closure plates 108a and 108b and side closure plates 110a, 110b are welded about the periphery of weldment plates 98 and 100 to provide valve tie plate 64 as a unitary closed structure defining a generally flat, planar gate passage 96 (FIG. 2F).

Valve gates 90, 92 and 94 (FIG. 2D) may be positioned by sliding them a short distance within gate passage 96 to position the gate openings 92a, 90b and 94a either in register (open position) or out of register (closed position) with the throats of the water tubes and aligned pairs of openings 102a and 102b. When fully in register, the gate openings are aligned fully with the water tube throats, and an open water flow passage is provided through each water tube of a tier 55a, 55b or 55c. When the gate openings 92a–94a are aligned with non-flow areas 89 (FIG. 2F), they are fully out of register with the water tube throats, and water flow is simultaneously closed through each water tube opening of a given tier. Thus, valve gates 90, 92 and 94 are moved by their associated operating mechanisms 97, 99 and 101 between a closed position and an open position. The operating mechanisms are controlled by any suitable control means. In FIG. 2D, valve gates 92 and 94 are shown in the closed position and valve gate 90 is shown in the open position. It be appreciated that each of the valve gates 90, 92 and 94 may be operated independently so that all draft tubes of selected tiers may be opened and all draft tubes of other tiers closed.

Figure 2G:
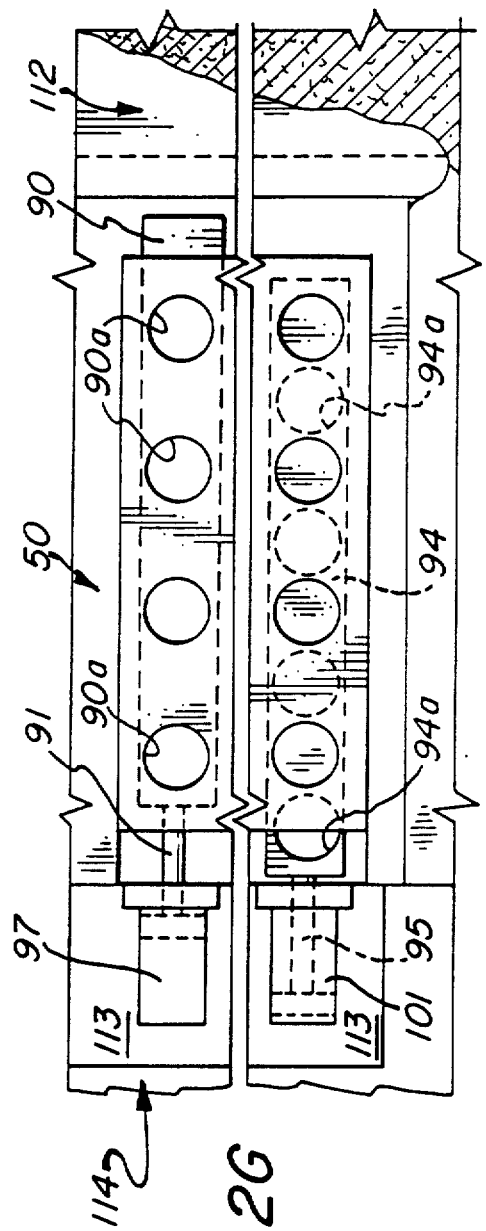
FIG. 2G is a schematic section view in elevation, with parts broken away, of the apparatus of FIG. 2 installed in a retaining means in a water course.
Figure 2F:
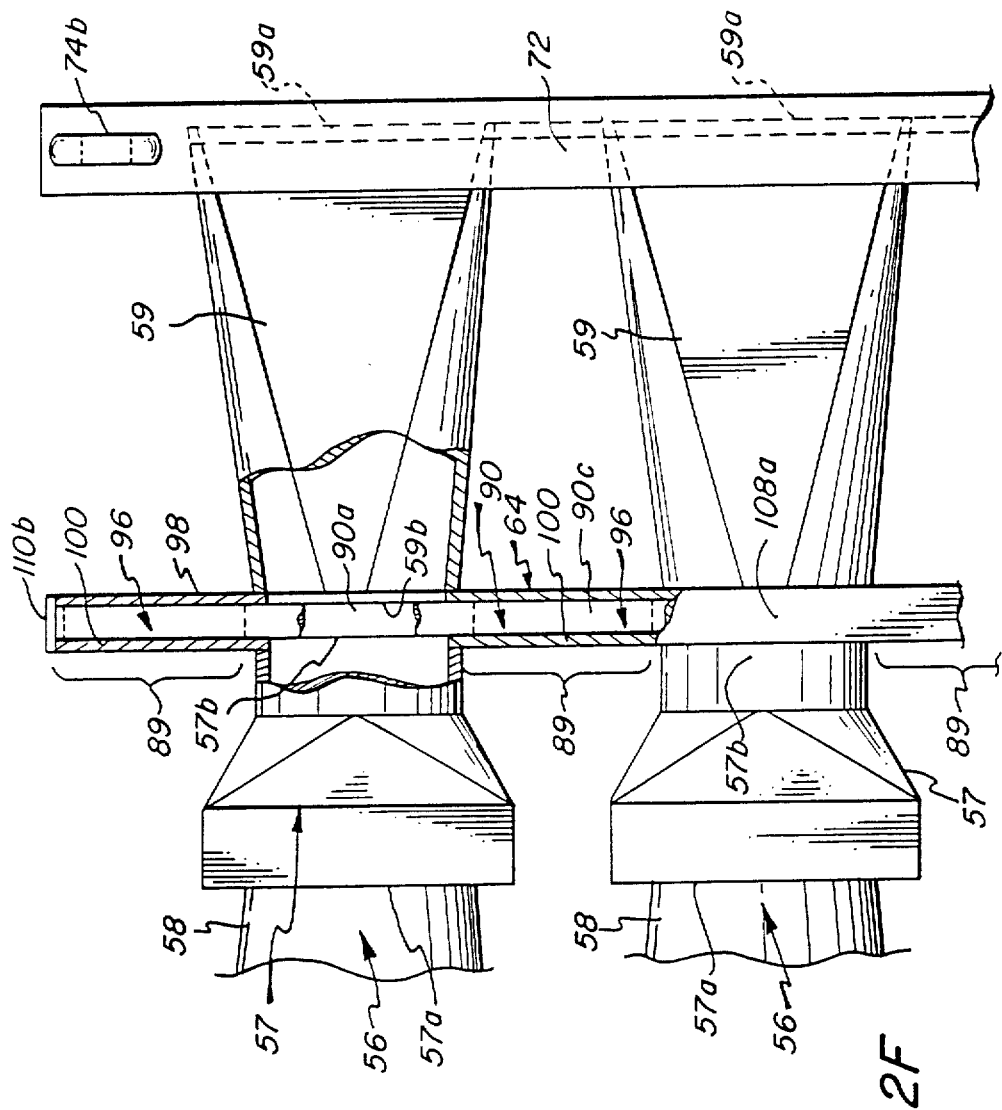
FIG. 2D is an elevation view with parts broken away of the valve tie plate of the apparatus of FIG. 2.
FIG. 2E is an exploded view in side elevation of the valve tie plate of FIG. 2D.

Referring now to FIG. 2G, there is shown a schematic illustration of two of the valve gates of the hydromotive machine apparatus 50 installed in a water course and viewed in elevation from the downstream side of the installation. Concrete piers or gates 112, 114 are constructed at the opposite banks of the water course, e.g., a stream or river, and the hydromotive machine apparatus has been installed by being lowered into place and secured to concrete piers 112, 114, to provide a dam or weir-like structure across the water course. FIG. 2G is broken away so that only valve gates 90, 94 serving tiers 55a and 55c respectively, are shown. The operating mechanisms 97 and 101 are at one side of the assembly and, if necessary, a recess 113 may be formed within pier 114 to accommodate them. The pistons (unnumbered) mounted on respective operating rods 91 and 95 are shown in dash line rendition within their associated hydraulic cylinders of operating mechanisms 97 and 101. Valve gate 90 is shown in its open position, extended rightwardly as viewed in FIG. 2G, so that the gate openings 90a thereof are fully in register with the openings 102a, 102b (FIG. 2E) in valve tie plate 64 so as to admit water through the water tubes (not shown in FIG. 2G) of tier 55a. Valve gate 94 is shown in its closed position with the gate openings 94a thereof out of alignment with the openings 102a, 102b (FIG. 2E) of its tier 55c so that valve gate 94 closes off its associated water tubes (not shown in FIG. 2G) from flow of water therethrough.

It should be understood that valve gates such as valve gates 90, 92 and 94 may alternatively be mounted vertically, to control a vertical column of water tubes and their associated machines. In such case, the operating mechanisms are conveniently placed at the top of the vertical column of water tube/hydromotive machine combinations.

Figure 3:
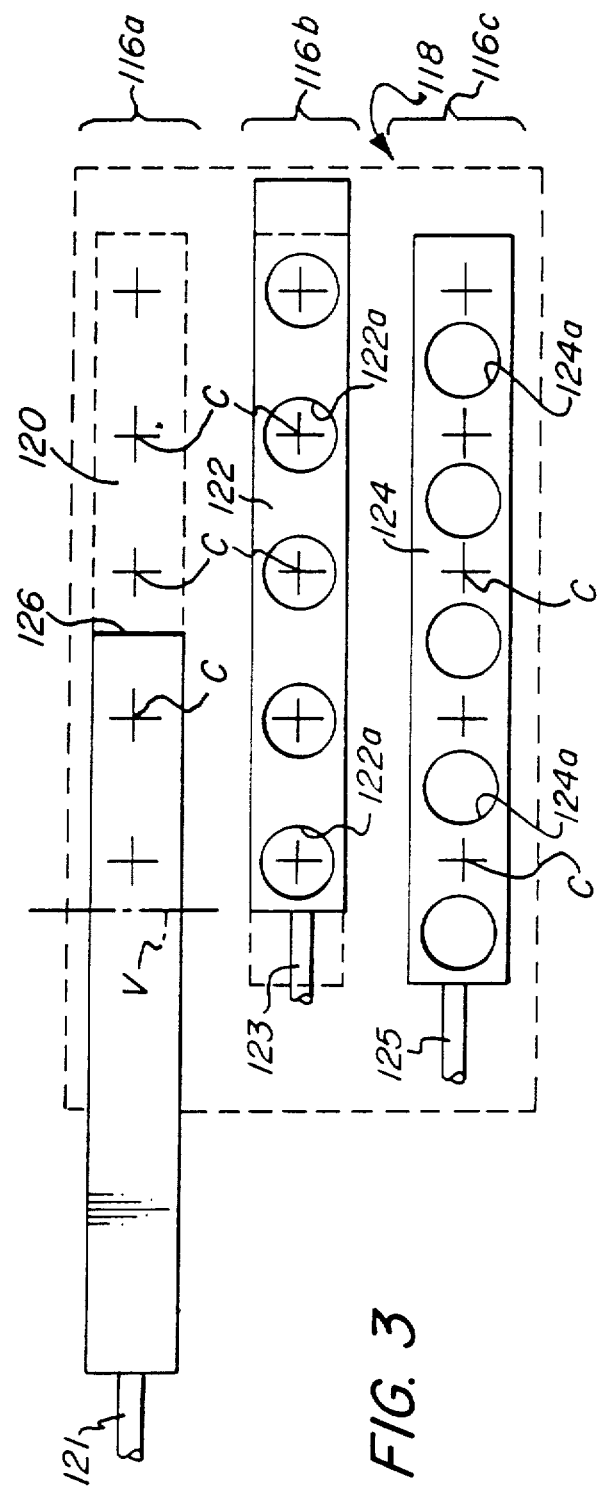
FIG. 3 is a schematic view similar to that of FIG. 2G and showing another embodiment of the apparatus of the present invention.

Referring now to FIG. 3, there is shown a schematic illustration of another embodiment of the invention in which three tier, 116a, 116b and 116c, of water tubes and associated hydromotive machines (not shown in FIG. 3) are provided by a hydromotive machine apparatus schematically shown by dash lines at 118. The cross-lines C illustrate the cross-sectional center lines of flow through the respective water tubes (not shown) of apparatus 118 and the valve gates 120, 122 and 124 are each equipped with respective operating rods 121, 123 and 125, in turn respectively connected to suitable operating mechanisms (not shown). Valve gates 122 and 124 are each provided with five gate openings 122a and 124a, respectively, whereas valve gate 120 is a continuous plate containing no gate openings or other apertures. Accordingly, in order to open an associated water tube for water flow therethrough, the distal edge 126 of valve gate 120 must clear the associated water tube, in a leftward direction as viewed in FIG. 4. Thus, in order to open all five of the water tubes served by valve gate 120, its distal edge 126 must be aligned with, or be positioned to the left of, the vertical line V. Valve gate 120 is a sequential-operation valve which serves to sequentially open and close the water tubes of tier 116a, thereby providing added flexibility in operation. In contrast, valve gates 122 and 124 are simultaneous-operation valves which simultaneously open and close all the water tubes of, respectively, tiers 116b and 116c.

Figure 4:
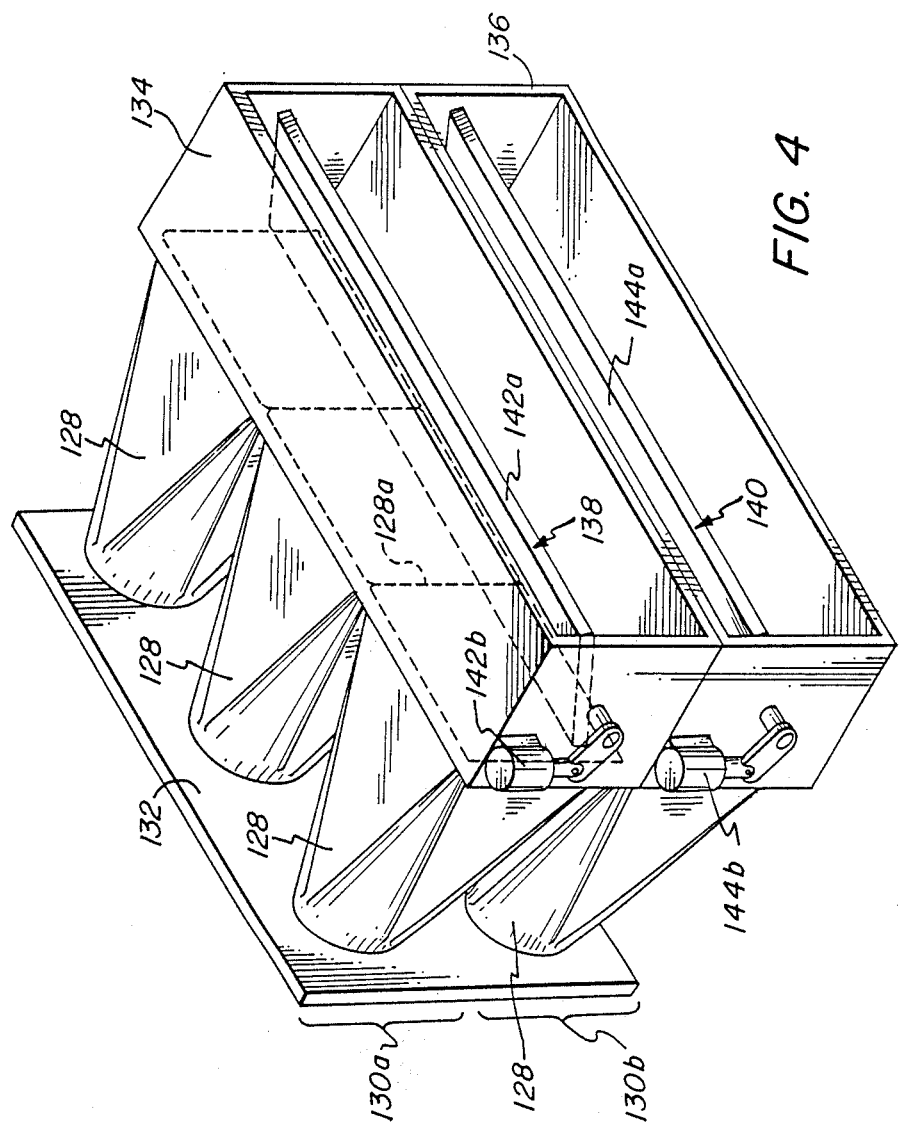
FIG. 4 is a schematic perspective view of a draft tube module equipped with butterfly type valve means in accordance with another embodiment of the present invention.

FIG. 4 schematically shows another embodiment of the invention in an apparatus including an array of water tubes, only the draft tubes 128 of which are shown, mounted in two tiers, 130a, 130b, on a valve tie plate 132. Each of the draft tubes 128 is connected at its discharge end 128a to an associated one of water boxes 134, 136 in which valve means 138, 140 are respectively mounted. Water boxes 134, 136 are stacked one above the other so that water box 134 serves tier 130a and water box 136 serves tier 130b. Valve means 138, 140 comprise, in this embodiment, respective flap plates 142a, 144a and respective actuators 142b, 144b. The flap plates may be independently controlled by the actuators or operated in tandem, as is the case with the valve means of the other embodiments. Thus, valve means 138, 140 include flap plates 142a, 144a extending across the discharge ends 128a of respective tiers 130a, 130b. The flap plates are moveable between full open, a range of intermediate, and full closed positions. As an alternative to the use of a single butterfly plate as shown, each draft tube of one or both tiers may be provided at its discharge end with an individual butterfly valve flap plate for individual operation or the individual flap plates may be mounted on a common operating shaft for ganged operation.

If sequential operation of the hydromotive machines, e.g., the turbine generator sets associated with the apparatus 118 of FIG. 3 is desired, the lower tier (or the lowest tier, e.g. tier 116c of FIG. 3, when three or more tiers are involved) is generally opened first in order to completely submerge the discharge ends of the operating draft tubes even at low tail water levels, to assure efficient operation of the machines, e.g., hydromotive turbines. The next higher tier of turbines would be activated thereafter by opening the next higher flow control valve gate, e.g., gate 120 in FIG. 3.

Figure 5:
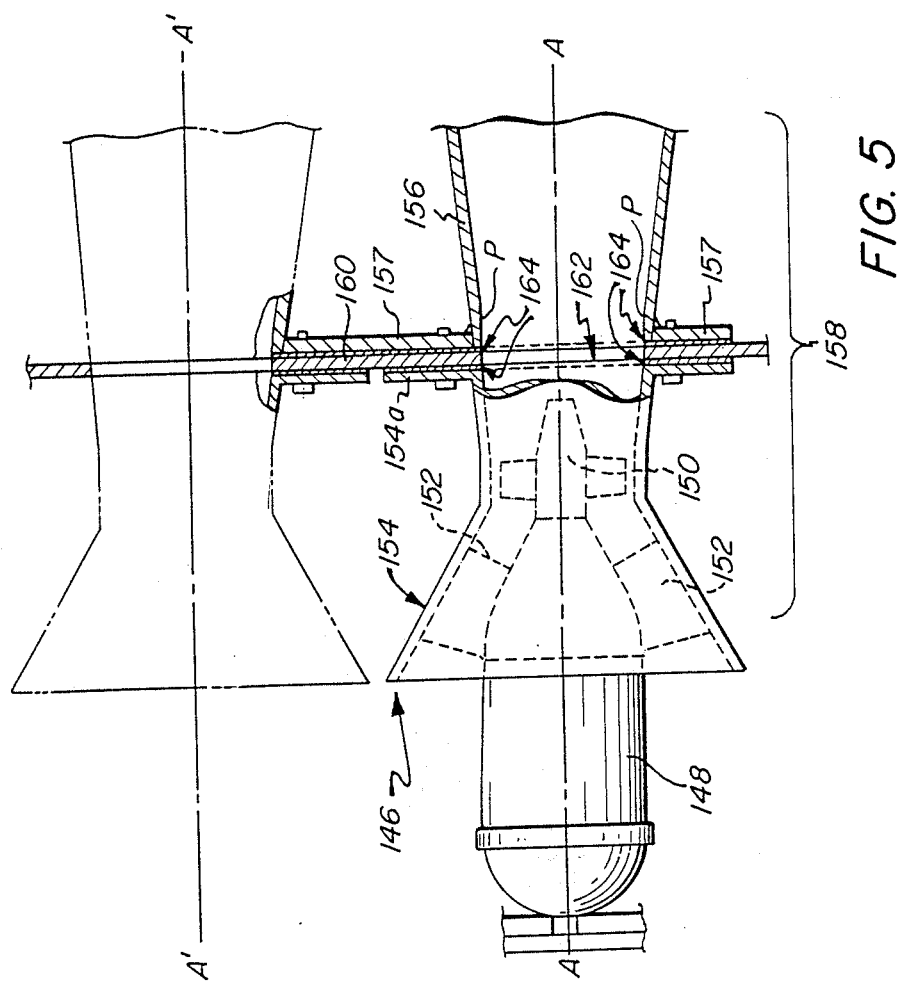
FIG. 5 is a partial side elevation view, with parts broken away and shown in section, of a hydromotive machine apparatus in accordance with another embodiment of the present invention.

Referring now to FIG. 5, there is shown a portion of a hydromotive machine apparatus 146 including a hydraulic turbine generator 148 having a runner 150 (shown in dash outline) and mounted to a distributor shroud 154 by a plurality of guide vanes 152, only two of which are shown, in dash outline, within the distributor shroud 154. The longitudinal axes of generator 148 and its associated water tube 158, i.e., the water tube on which the generator is mounted, are coincident and shown by dot-dash line A—A in FIG. 5; the longitudinal axis of the water tube shown in dot-dash outline in FIG. 5 is indicated by line A'—A'. A draft tube 156, only part of which is shown, is welded or otherwise suitably connected to a weldment plate 157 to which a plurality of other draft tubes (only one of which is shown in FIG. 5, in dot-dash outline) are connected. The plurality of draft tubes 156 connected to weldment plate 157 provides a unitary draft module. A plurality of distributor shrouds 154 is connected to the resulting draft module to place each connected distributor shroud in water flow communication with an associated draft tube 156, the distributor shroud and draft tube cooperating to comprise a water tube 158. For purposes of facilitating such connection, distributor shrouds 154 have flanges 154a extending therefrom. As illustrated in FIG. 5, flanges 154a are bolted to weldment plate 157 through a spacer plate or bar 160. A valve gate (not shown) is mounted for sliding movement within a gate passage 162, in a manner similar to that described in detail with respect to the embodiment of FIGS. 2-2G. A second tier of generators and their associated water tubes is indicated by the dot-dash outline of a water tube depicted above machine 148 and its associated water tube 158. In this embodiment, it will be noted that the distributor shrouds 154 comprise discrete, separable units which are individually bolted through the spacer plates 160 and to weldment plate 157 of the draft module.

Figure 6:
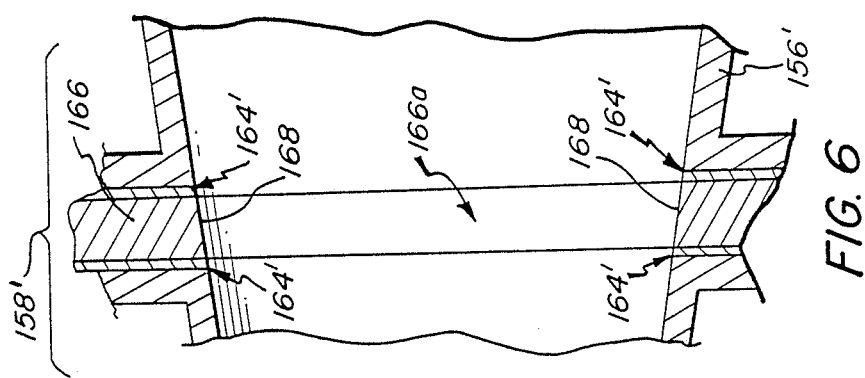
FIG. 6 is a partial plan view in section of the throat portion of a water tube component of apparatus in accordance with yet another embodiment of the present invention.

Water tube 158 of FIG. 5 is configured so that the throat portion 164 thereof is of constant diameter, the draft tube 156 starting to flare outwardly only from a plane, indicated by points P, which is slightly downstream of throat 164. FIGS. 6-6B illustrate an alternate embodiment of the invention in which there is shown in plan section view the throat portion 164' of a water tube 158', which includes a draft tube 156'. A gate opening 166a is formed in a valve gate 166 which serves water tube 158'. The gate opening 166a has a tapered sidewall 168 which is flared outwardly as sensed in the direction of water flow to match the angle of divergence, of, the interior surface of water tube 158' in the vicinity of the throat 164'.

Figure 7:
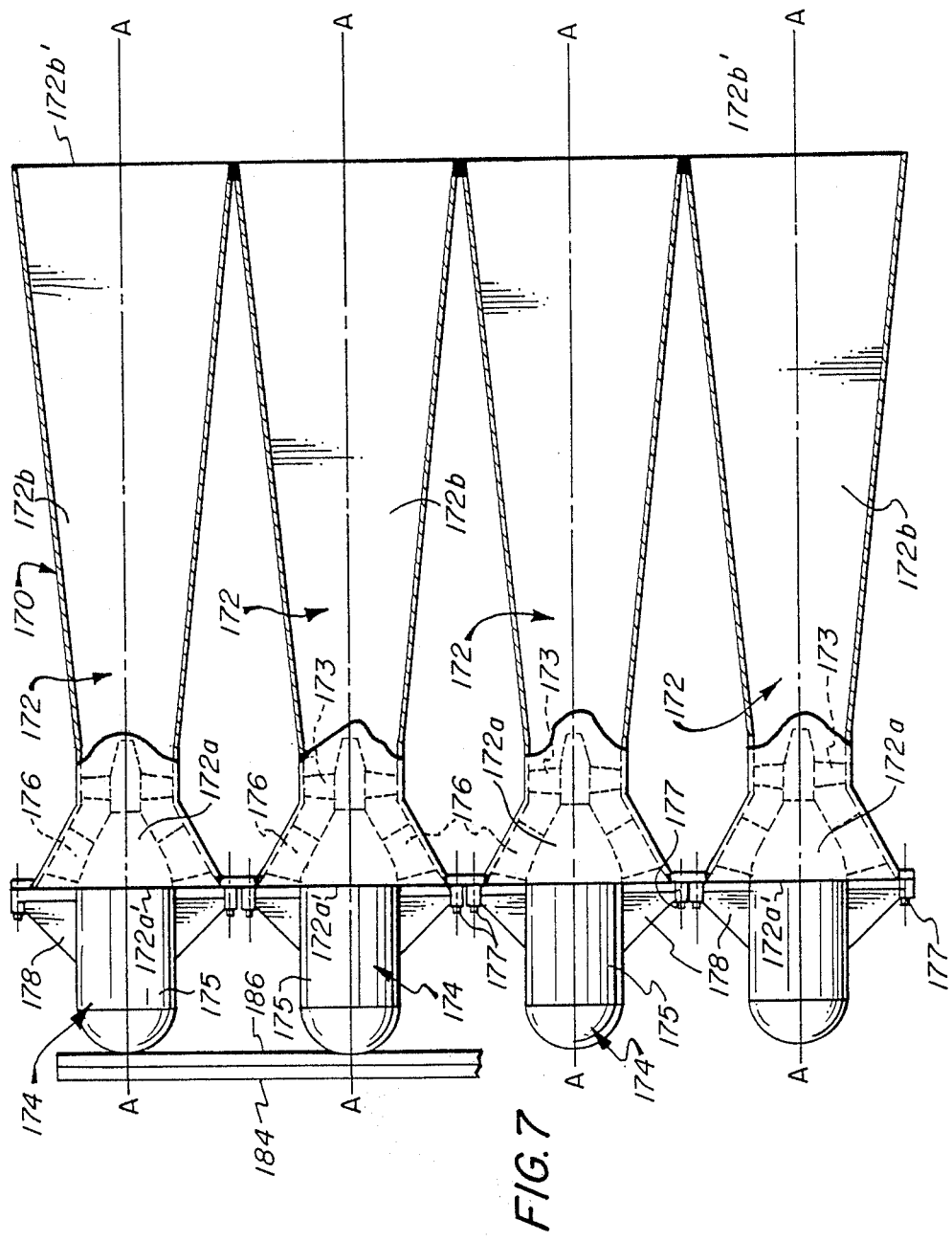
FIG. 7 is a schematic partial plan view in side elevation of another embodiment of the apparatus of the present invention showing bolt-on hydroelectric generator sets supported by the water tube assembly.
Figure 7A:
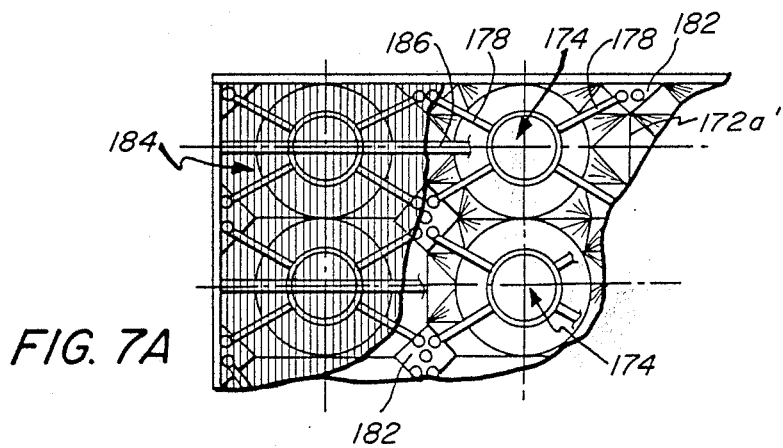
FIG. 7A is a partial end view in elevation of the upstream side of the apparatus of FIG. 7.

Referring now to FIGS. 7 and 7A, there is illustrated another embodiment of the invention wherein a hydromotive machine apparatus 170 is comprised of a plurality of water tubes 172 each of which is comprised of a distributor shroud section 172a and a draft tube section 172b. In this embodiment, water tubes 172 are of integral, unitary construction, that is, they comprise one piece water tubes having distributor shroud sections 172a and draft sections 172b. Individual, unitary water tubes 172 are joined to each other at the upstream or inlet ends 172a' and at the downstream or discharge ends 172b' thereof. They may be joined by any suitable or convenient means, such as by welding the peripheral edges of the inlet ends 172a' to each other and the peripheral edges of the discharge ends 172b to each other. The tubes may be welded or otherwise joined directly to each other or connecting devices such as box channels, flanges, bars or the like may be employed. The resultant bulkhead assembly may be further reinforced or stiffened by tie plates, tie rods or bars or the like.

A plurality of machines comprising hydraulic generator turbines 174 having runners 173 are mounted within the distributor shroud sections 172a of apparatus 170. The longitudinal axes of the machines 174 and their respective associated water tubes 172 are coincident and are shown in FIG. 7 by dash lines A—A. The longitudinal axes of the water tubes 172 are coincident with the entire longitudinal axis of machines 174.

Each of turbines 174 comprises a stator housing 175 which has guide vanes 176 and four (as seen in FIG. 7A) stay vanes 178 integrally formed therewith or suitably affixed thereto. Generator turbines 174 are mounted on water tubes 172 by means of the stay vanes 178 being bolted or otherwise suitably removably affixed to the distributor shroud sections 172a by bolts 177 connected to tie plates 182. As best seen in FIG. 7A, each of the stay vanes 178 is bolted to one of the tie plates 182, which are secured, as by welding, to the inlet ends 172a' of draft tubes 170. Diamond shaped tie plate 182 has four stay vanes 178 affixed thereto and is located at the junctures where respective corners of four of the water tubes 172 meet in the upstream face of the apparatus 170. The upstream face lies in the plane in which the various inlet ends 172a' lie.

A trash screen 184 is mounted on a support grid 186 comprised of vertical and horizontal members affixed to the upstream ends of the machines 174. Lifting eyes or other structures (not shown) may be provided on the apparatus to facilitate moving and lifting it by a crane or other suitable lifting hoist for transportation and implacement of the entire unit into a water passageway.

Thus, FIGS. 7 and 7A illustrate an embodiment of the invention wherein the bulkhead assembly is provided by utilizing unitary or single piece water tubes 172. By way of comparison, the embodiment of FIG. 5 shows a plurality of draft tubes 156 joined together to form a draft module, i.e., an integral assembly of draft tubes, to which a plurality of individual distributor shrouds 154 is affixed. On the other hand, the embodiment of FIGS. 2-2G is made from a draft module of draft tubes 59 and a separate, distributor module comprised of distributor shrouds 57 joined together in an integral unit.

Figure 8:
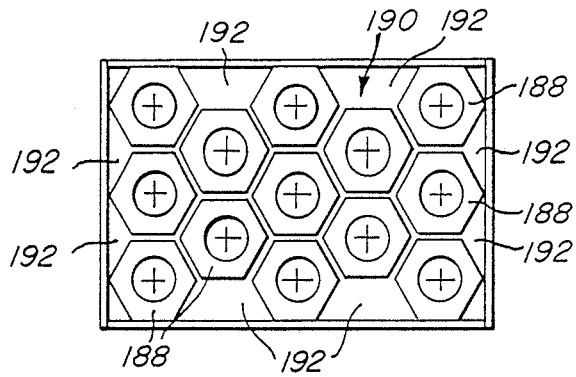
FIG. 8 is a schematic view in end elevation of an apparatus in accordance with another aspect of the invention showing a hexagonal arrangement of the water tubes.

Generally, as illustrated in the embodiments of FIGS. 2-2G, FIG. 5, and FIGS. 7 and 7A, in cross section the water tubes have a rectangular, usually square, configuration at the inlet end of the distributor shroud, make a transition to a circular cross section at the throat portion of the water tube, and then make another transition to a rectangular, usually square, cross section at the discharge end of the draft tube. While the throat portion is normally of circular configuration, one or both of the inlet section of the distributor shroud and the discharge section of the draft tube may have a cross-sectional configuration other than square or rectangular, for example, hexagonal or circular. FIG. 8 illustrates the cross-sectional configuration at either or both upstream and downstream ends of the water tubes as hexagonal. A plurality of water tubes 188 having a hexagonal cross section at the inlet end and/or discharge ends thereof is illustrated as mounted on a tie plate 190 which includes wall portions 192 to seal against water flow through the spaces inevitably left between hexagonal water tubes when they are arranged in an array in which the flow centers of the tubes are in a rectangular pattern as sensed in flow cross section. Notwithstanding the hexagonal cross-sectional end or ends of the water tubes 188, the throat portions of the water tubes, indicated by the unnumbered circles of FIG. 8, are circular in configuration, the center lines of flow being indicated by the intersection of the crosses (unnumbered). It will be noted that notwithstanding the hexagonal cross-sectional configuration of the ends of the water tubes 188, the throat portions thereof are aligned in straight horizontal tiers and straight vertical columns so that the apparatus, if desired, may be equipped with either horizontal or vertical acting valve means of the type illustrated in, e.g., FIG. 3.

FIG. 9 is a schematic rendition of yet another embodiment of the invention wherein the hydromotive machine apparatus 194 is comprised of a plurality of water tubes 196 within which a plurality of generators 198 (only two shown) are mounted. The machines 198 are mounted by guide vanes 200 and the runners (unnumbered) of adjacent machines are mounted for rotation in opposite directions. The guide vanes 200 are appropriately skewed for each water tube 196 to swirl the water in the appropriate direction, indicated by the unnumbered arrows in FIG. 9. As indicated by these unnumbered arrows, the array of water tubes may be arranged so that each array discharges water therefrom with an oppositely directed swirling eddy from that of each water tube adjacent to it. As the direction of the unnumbered arrows in FIG. 9 indicates, this provides cocurrent swirling flow between adjacent eddies thereby reducing turbulence and providing a smoother discharge of water from the apparatus of the invention.

Among the advantages provided by the present invention are certain economies which are attainable in the electrical control and transmission lines for transmitting electrical power from the generators of the apparatus to the power distribution system. Groups of generators may be ganged and connected to a bus means via a single transmission line equipped with a circuit breaker, thus avoiding the necessity of providing a separate circuit breaker for each generator. Conventional current sensing means are electrically connected between each generator and a control means for the circuit breaker. If any one of the generators develops electrical problems such as a short circuit, the circuit breaker will be tripped in response thereto, thus electrically disconnecting all of the ganged generators. Water flow through the electrically disconnected ganged generators is terminated to shut down the monitored group of generators which contains the malfunctioning generator or generators. The generators may then be inspected, repaired and/or replaced as required. Conveniently, a unitary valve means, such as those described above, which is capable of simultaneously opening and closing water flow through the ganged group of monitored generators will be associated therewith. That is, the same group of electrically monitored generators will be served by a single valve means or by a group of simultaneously controlled valve means. Conveniently, when an electrical malfunction occurs in one of an electrically monitored group of generators so as to trip the circuit breaker of the transmission line serving that monitored group, the tripping of the circuit breaker will simultaneously actuate a valve means serving each generator of the group to substantially simultaneously stop the water flow through the group of electrically disconnected generators.

Figure 10:
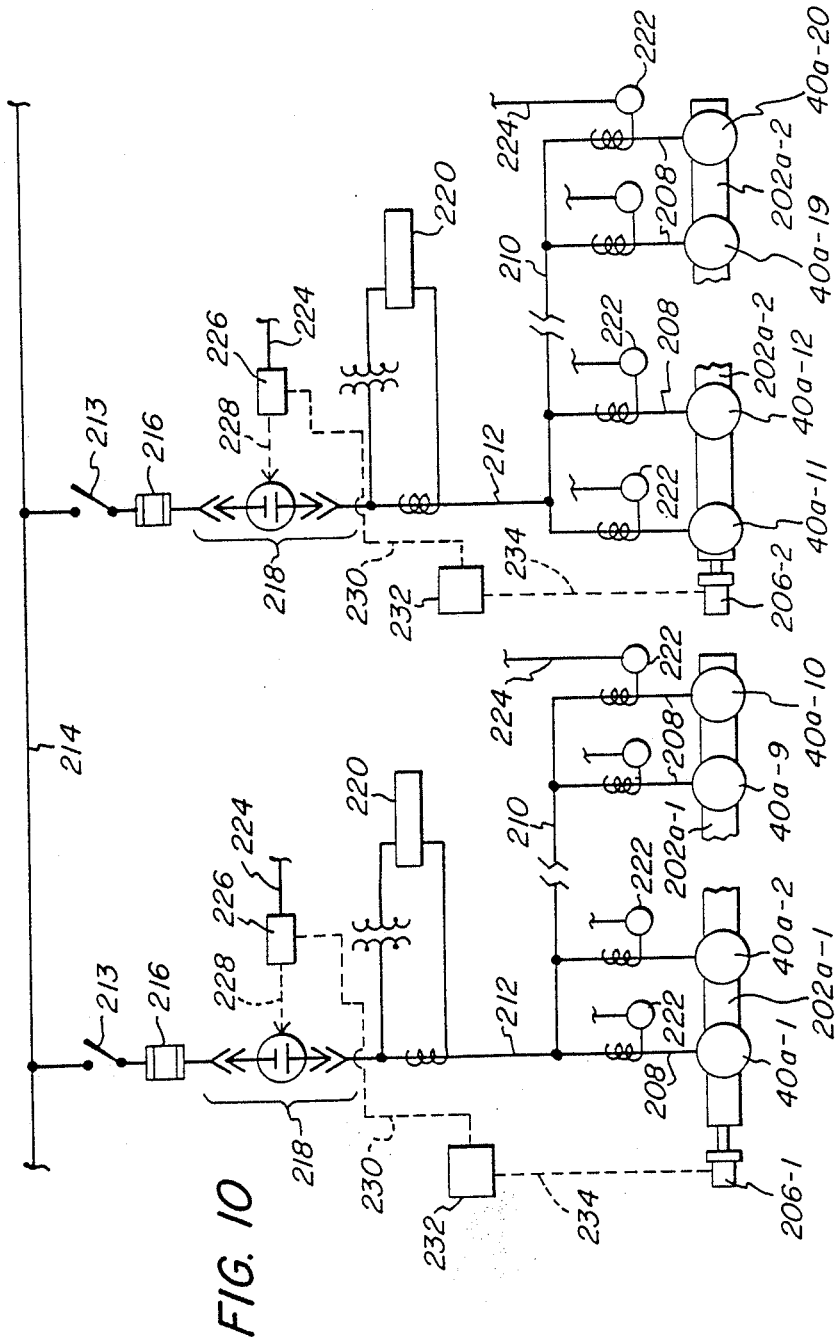
FIG. 10 is a schematic diagram of apparatus in accordance with yet another aspect of the invention showing power transmission and control circuitry.

This aspect of the invention is schematically illustrated in FIG. 10 in an embodiment which could be applied to the hydromotive module apparatus sets or units 38a-38h installed in dam 10 of FIGS. 1-1C. As described with respect to FIG. 1B, each one of the hydromotive generator apparatus sets 38a-38h is comprised of 100 generator sets 40, arranged in a ten by ten array of ten horizontal tiers each containing ten generator sets and their associated water tubes. In FIG. 10, the generator sets 40 are individually numbered, arbitrarily starting with the top tier and numbering from left to right as viewed in FIG. 1B. Thus, the generator sets 40 of FIG. 1B are shown in FIG. 10 as 40a-1, 40a-2, for the first two generators of the top tier, and as 40a-9 and 40a-10 for the last two generator sets in the top tier. The six intermediate generator sets are not shown, as portions of the schematic plan of FIG. 10 are broken away for simplicity of illustration. The generators of the horizontal tier immediately below the top horizontal tier of generators of apparatus set or unit 38a in FIG. 1B, are shown in FIG. 10 as generators 40a-11, 40a-12 . . . 40a-19 and 40a-20. As illustrated in FIG. 10, each horizontal tier of generators 40 has a valve gate means similar to those, for example, illustrated in FIG. 2D as valve gates 90, 92 and 94. Thus, valve gate 202a-1 is mounted for sliding movement transversely of the top tier comprised of generators 40a-1 through 40a-10 inclusively, and valve gate 202a-2 is mounted for sliding movement transversely of the second tier of generators 40a-11 through 40a-20. It will be appreciated that the remaining tiers of generators of apparatus set 38a of FIG. 1B are identically electrically connected and equipped with valve gate means in the same manner as illustrated in FIG. 10 for the two top tiers of machines 40. The valve gate means 202a-1 and 202a-2 each contain a plurality of gate openings (not shown in FIG. 10) which are movable into and out of register to simultaneously open or close to water flow the water tubes of each generator of a tier. Operating mechanisms 206-1 and 206-2 are connected, respectively, to valve gates 202a-1 and 202a-2. Individual electrical connectors 208 connect each of generators 40a-1 through 40a-10 via a connector branch 210 to a transmission line 212 which in turn feeds into a bus distributor line 214. A throw switch 213, a fuse 216 and a circuit breaker 218 are connected in series in transmission line 212. A meter panel 220 is appropriately electrically connected to transmission line 212 to permit visual monitoring.

Each of electrical connector lines 208 is provided with a current monitoring means 222 which is electrically connected by an associated line 224 (broken in FIG. 10 for improved clarity of illustration) to a circuit breaker control means 226 which is operatively connected by a control line 228 to circuit breaker 218. A line 230 connects a valve control means 232 to circuit breaker control means 226 and a control line 234 connects valve control means 232 to operating mechanism 206-1, 206-2 etc. The second and each subsequent tier of apparatus set 38a is identically electrically connected; the corresponding illustrated parts for the second tier (generators 40a-11 through 40a-20) being identically numbered to those of the first tier. It will further be appreciated that each of the hydromotive apparatus sets 38a-38h is similarly or identically electrically connected and provided with a unitary valve means in the manner illustrated in FIG. 10 with respect to two tiers of set 38a. It will further be appreciated that smaller or larger numbers of individual generators may comprise separate monitored groups of generators. However, it is convenient to have the same group of generators which comprise an electrically monitored group of generators to be controlled by the same or simultaneously operated valves.

If one or more generators of a monitored group, for example, if one or more of generators 40a-1 through 40a-10 begins to malfunction electrically, as by developing a short circuit, this malfunction is detected by the current monitoring means 222 and an appropriate signal is thereby generated and transmitted through line 224 to circuit breaker control means 226. In response, circuit breaker control means 226 generates a first control signal which is transmitted via line 230 to valve control means 232. Valve control means 232 in turn generates a valve operating signal which is transmitted via control line 234 to operating mechanism 206-1 to move valve gate 202a-1 to its closed position. Thereby, water flow through the water tubes of each of the electrically monitored group of generators 40a-1 through 40a-10 is simultaneously shut off. The other nine tiers of generators in apparatus set 38a remain in operation. Control means 226 also generates, in response to the malfunction signal from line 224, a second control signal which is transmitted via control line 228 to throw circuit breaker 218 and electrically disconnect transmission line 212 from bus distributor line 214. The water flow through the monitored group and the electrical connection of the monitored group to bus distributor line 214 are shut off substantially simultaneously. It will be appreciated that mechanical as well as electrical problems may be monitored and in case of mechanical malfunction of a generator, shutting off the water flow may be started prior to breaking the electrical connection.

Generally, the present invention provides a number of advantages, including relatively lightweight and high structural strength of the hydromotive machine apparatus of the invention, which enables transporting the apparatus from a point of construction or assembly to its operation site at a submerged location in a water course. By providing a relatively large number of small machines at a given installation as opposed to a lesser number of larger machines, the apparatus has enhanced flexibility in dealing with even a wide range of water flow fluctuations. Thus, the provision of suitable valve means, either as part of the apparatus itself as described above or as part of the dam or power site structure in which the apparatus of the invention is installed, enables shutting off a selected number of machines during periods of low water flow or low head water level. As water availability increases, an increasing proportion of the total number of hydromotive machines of the apparatus can be made accessible to water flow.

One significant advantage provided by the present invention is the ability to retrofit existing structures by configuring an array of water tubes and associated hydromotive machines to fit into existing stop log slots, gates, water tunnels or the like of existing structures. The bulkhead assembly comprised of an array of interconnected water tubes having sufficient structural strength to resist the pressure differentials which will act across it, can be designed to fit into the pre-existing opening. The technique of the present invention allows for "customizing" the size and cross-sectional shape of the bulkhead assembly by using a plurality of small units. Such customizing is not possible with large generator units.

Another significant advantage provided by the invention is substantial cost savings as compared to conventional installations employing relatively much fewer and much larger generating machines. Essentially, these cost savings are attained because the greatly reduced weight per unit of power output correspondingly reduces the size of foundations, footings and other civil construction needed to support the generating plant. The use of smaller units permits higher runner speeds of the individual units, thereby eliminating the need for speed increasers as well as providing numerous other advantages. Some of these advantages are exemplified by the following comparison of an embodiment of the invention as described with respect to FIGS. 1–1B and 10, to a conventional power installation for the same site.

TABLE
HYDROELECTRIC PROJECT CONFIGURATION AND COST SPECIFICATIONS

| | COMPARATIVE CONVENTIONAL CONFIGURATION | CONFIGURATION OF AN EMBODIMENT OF THE PRESENT INVENTION |
|---|---|---|
| Power Plant Dimensions | 242 ft. long × 456 ft. wide × 124 ft. high | 140 ft. long × 454 ft. wide × 124 ft. high |
| Concrete Required | 116,000 cu. yds. | 70,000 cu. yds. |
| Construction Time | 4 years | 3 years |
| No. of Generating Units | 8 | 800 (8 arrays of 100 units, each array comprising 10 superposed horizontal tiers of 10 units per tier) |
| Type of Generating Units | Bulb | Bulb |
| Type of Drive | Speed Increaser | Direct Drive |
| Unit Output | 24 mw per unit | 24 mw per array of 100 units |
| Units Per Draft Tube Gate | 1 | 10 |
| Plant Output | 192 mw | 192 mw |
| Shutoff Gate Type | Draft Tube | Draft Tube |
| Average Annual Production | 784 Gigawatt Hours | 784 Gigawatt Hours |
| Turbine Runner Diameter | 8.2 meters | .83 meter |
| Turbine Speed | 52 rpm | 514 rpm |
| Generator Speed | 600 rpm | 514 rpm |
| Foundation Surface Area | 110,000 sq. ft. | 63,000 sq. ft. |
| Construction Cost[a] | $150,000,000 | $125,000,000 |
| Equipment Cost[b] | $200,000,000 | $150,000,000 |
| Interest Paid During Construction | $200,000,000 | $125,000,000 |
| TOTAL PROJECT COST | $550,000,000 | $400,000,000 |

[a] Install and remove cofferdams, excavation work, foundation work, concrete structure, structural steel, etc.
[b] Turbines, generators, controls, etc.

It is seen that for a project of this size, approximately $150,000,000 is saved by utilizing an embodiment of the present invention and the project is completed in three years instead of four. Note that the upstream-downstream length of the facility of the embodiment of the invention is more than 100 feet shorter than that of the conventional installation, but provides the same power output. In addition, as noted above, the installation of the embodiment of the invention provides greater flexibility in accommodating variations in available water flow rate. Further, in the comparative conventional configuration, if one generator breaks down, one-eighth or 12.5% of the total generating capacity is lost while the unit is off line whereas, in the invention embodiment configuration, if one generator breaks down so that a tier of ten generators must be taken off line, only 1.25 percent of the total generation capacity is lost during the off-line period.

The embodiments described in detail are only illustrative and numerous other variations in design lie within the scope of the invention. For example, the hydraulic generator set or pump, e.g., axial pump, mounted on the bulkhead assembly may be reversed from the position shown, for example, in FIG. 7. Thus, the machines 174 of FIG. 7 could be mounted on the apparatus 170 with their runners 173 facing upstream, i.e., facing in the direction of the trash screen 184, with the stator housings 175 downstream of the runners 173. Appropriate changes in the dimensions and configuration of the water tube 172 might be required to accommodate such positioning.

The bulkhead assemblies need not be positioned horizontally as illustrated in the Figures. In some cases, the water passage within which the assembly is received may be angled from the horizontal and the bulkhead assembly of the present invention and the machines mounted thereon may conveniently be positioned at an angle to the horizontal, for example, positioned so that the water flows through the water tubes at a downward angle relative to the horizontal.

Generally, the arrayed machines and water tube assembly of the present invention can be constructed in either linear or rectangular arrays, depending upon the size of the turbine generator sets or pumps used and the available space at the submerged operating position in the water course or passageway. That is, a vertical stack of a plurality of machine/water tube combinations which is only one machine/water tube wide may be used, a horizontal tier of a plurality of machine/water tube combinations which is only one machine/water tube high may be used, or a plurality of superposed tiers each containing a plurality of machine/draft tube combinations may be used. Types of flow control valves other than those illustrated can be used to control the flow of water through the water tubes and past their associated turbine generator sets of pumps. Alternatively, the distributor vanes can be used for this purpose.

While the present invention has been described in detail with respect to specific illustrated embodiments, it should be understood that numerous modifications and substitutions can be made to the illustrated embodiments without departing from the spirit of the invention.

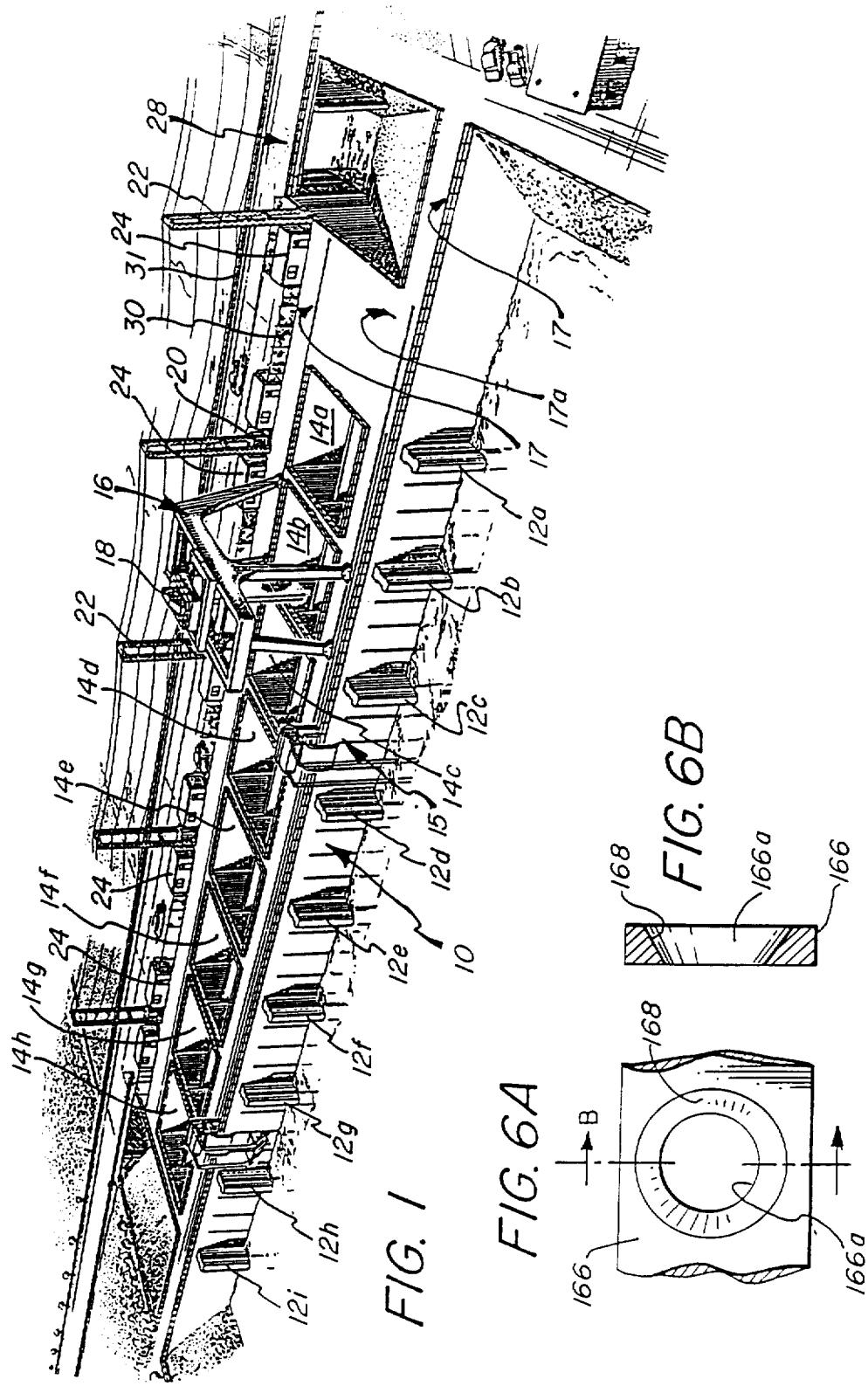

What is claimed is:
1. A hydromotive machine apparatus comprising:
(a) a bulkhead assembly having a distributor section defining an upstream face and a draft section defin- ing a downstream face, said bulkhead assembly being comprised of an array of water tubes having their longitudinal axes in parallel and being connected to each other to provide a truss structure defining a plurality of water flow paths extending from said upstream face to said downstream face; and (b) a plurality of submersible hydromotive machines, each machine having a runner rotatably mounted thereon and being mounted on the bulkhead assembly in association with one of said water tubes and with its runner disposed within the water flow path of its associated water tube.

2. The apparatus of claim 1 wherein said machines are mounted on the distributor section of said bulkhead assembly.

3. The apparatus of claim 1 wherein said water tubes individually comprise a distributor shroud and a draft tube, the distributor shrouds defining said distributor section of said bulkhead assembly and the draft tubes defining said draft section of said bulkhead assembly.

4. The apparatus of claim 3 wherein said hydromotive machines are mounted on respective ones of said distributor shrouds.

5. The apparatus of any one of claims 1, 2 or 3 wherein said water tubes are joined to each other by two or more longitudinally spaced-apart tie means, at least one of which is in said draft section, to provide said bulkhead assembly as a truss structure in which said water tubes serve as trusses tying said tie means to each other.

6. The apparatus of claim 5 wherein one of said tie means is at said downstream face.

7. The apparatus of claim 5 wherein one of said tie means is connected to said distributor section and another of said tie means is connected to said draft section.

8. The apparatus of claim 5 wherein one or more of said tie means comprise tie plates disposed transversely of said water tubes and connected thereto.

9. The apparatus of claim 1 including mounting means which detachably affix said machines to said bulkhead assembly and are accessible from said upstream face whereby individual ones of said machines may be removed intact from said bulkhead assembly and replaced thereof from the upstream face thereof.

10. The apparatus of any one of claims 1, 2 or 3 wherein said bulkhead assembly is comprised of a unitary draft module comprising a plurality of draft tubes joined to each other, and said individual distributor shrouds are affixed to said draft module.

11. The apparatus of claim 10 wherein said bulkhead assembly is further comprised of a unitary distributor module comprising a plurality of distributor shrouds joined to each other, and said distributor module is affixed to said draft module.

12. The apparatus of claim 10 wherein said draft tubes have respective discharge ends, said draft module includes a tie plate disposed transversely to the draft tubes and to which said draft tubes are joined, and further including means joining the discharge ends of adjacent ones of said draft tubes to each other, the joined discharge ends cooperating to define said downstream face.

13. The apparatus of claim 3 or claim 4 wherein said distributor shrouds have respective inlet ends and further including means joining the inlet ends of adjacent distributor shrouds to each other, the joined inlet ends cooperating to define said upstream face.

14. The apparatus of claim 13 wherein said draft tubes have respective discharge ends and further including means joining the discharge ends of adjacent tubes to each other, the joined discharge ends cooperating to define said downstream face.

15. The apparatus of any one of claims 1, 2 or 3 wherein said bulkhead assembly comprises a plurality of horizontally extending tiers, said tiers individually comprising a plurality of said water tubes, said tiers being superposed one tier above the other.

16. A generator apparatus comprising:
(a) a bulkhead assembly having a distributor section defining an upstream face and a draft section defining a downstream face, said bulkhead assembly being comprised of an array of water tubes having their longitudinal axes in parallel and being connected to each other by tie means which are longitudinally spaced apart relative to the water tubes, the water tubes acting as trusses between the spaced-apart tie means and cooperating to define a plurality of water flow paths extending from said upstream face to said downstream face; and
(b) a plurality of submersible hydraulic turbine generators, each generator having a runner rotatably mounted thereon and being mounted on the bulkhead assembly in association with one of said water tubes and with its runner disposed within the water flow path of its associated water tube.

17. A hydromotive apparatus comprising:
(a) a bulkhead assembly having a distributor section defining an upstream face and a draft section defining a downstream face, said bulkhead assembly being comprised of an array of water tubes having their longitudinal axes in parallel and being connected to each other to define a plurality of water flow paths extending from said upstream face to said downstream face;
(b) a plurality of hydromotive machines, each machine having a runner rotatably mounted thereon and being mounted on said bulkhead assembly with its runner disposed within a respective one of the water flow paths; and
(c) valve means mounted on said bulkhead assembly and comprising one or more unitary valve members moveable between a closed position in which said unitary valve member closes two or more of said water tubes against water flow therethrough, and an open position in which said unitary valve member opens said water tubes to water flow therethrough.

18. The apparatus of claim 17 wherein said unitary valve members comprise one or more valve gates mounted for sliding movement transversely across two or more of said water tubes.

19. The apparatus of claim 17 wherein said assembly includes one or more gate passages of flat, planar configuration extending transversely across at least two of said water tubes, and said valve gate is mounted for sliding movement through said gate passage.

20. The apparatus of claim 19 wherein said water tubes are spaced apart from each other at least in the plane of said gate passage to define in such plane non-flow areas adjacent to said draft tubes, and said valve gate has a plurality of spaced-apart gate openings formed therein, the gate openings being dimensioned and configured to be registered with the flow paths defined by said water tubes when said valve means is in the open position, and to be aligned with the non-flow areas and out of register with the flow paths when said valve means is in the closed position.

21. The apparatus of claim 20 wherein said gate passage extends tranversely across a diverging section of said water tube through a circumferential gap therein, and said gate openings are defined by a diverging wall which is dimensioned and configured, when said valve gate is in said closed position, to close said circumferential gap and provide a smooth interior surface of said diverging section of said water tube in the vicinity of said gap.

22. The apparatus of claim 20 wherein said assembly comprises at least two tiers of multiple water tubes and two or more of said gate passages, each gate passage being associated with a linear array of said draft tubes, and said assembly further includes a plurality of said valve gates, each of said valve gates being mounted for slidable movement through an associated one of the gate passages.

23. The apparatus of claim 17 wherein the valve means comprises a simultaneously-operating valve means for simultaneously controlling water flow through a plurality of said draft tubes.

24. The apparatus of claim 17 wherein the valve means comprises sequentially-operating valves for sequentially controlling water flow through a plurality of the draft tubes.

25. The apparatus of claim 17 wherein the valve means comprises simultaneously-operating valve means associated with a first plurality of the draft tubes and sequentially-operating means associated with a second plurality of the draft tubes.

26. The apparatus of claim 18 wherein said bulkhead assembly comprises one or more horizontally extending tiers of a plurality of said water tubes, and each of said valve gates are mounted for sliding movement transversely across the water tubes of a given tier.

27. The apparatus of claim 18 wherein said bulkhead assembly comprises one or more vertically extending columns of a plurality of said water tubes, and each of said valve gates are mounted for sliding movement transversely across the water tubes of a given column.

28. The apparatus of claim 1, claim 16 or claim 17 wherein said water tubes have respective downstream ends which are centered in a diamond pattern as sensed in flow cross section.

29. The apparatus of claim 1, claim 16 or claim 17 wherein said hydromotive machines are bulb turbine generators.

30. The apparatus of claim 1, claim 16 or claim 17 wherein said water tubes have respective downstream ends which are centered in a rectangular pattern as sensed in flow cross section.

31. The apparatus of claim 30 wherein the runners of immediately adjacent pairs of said hydromotive machines are mounted to rotate in opposite directions relative to each other, whereby water is discharged from said downstream ends in co-currently flowing eddies.

32. The apparatus of claim 31 further including vanes mounted within said distributor shrouds, said vanes being dimensioned and configured to impart opposite directions of swirl to water discharged from adjacent water tubes.

33. The apparatus of claim 1, claim 16 or claim 17 further including a trash screen mounted on the upstream end of said assembly.

34. The apparatus of claim 33 wherein said hydromotive machines are enclosed by housings and are mounted with their housings disposed at the upstream end of said bulkhead assembly, and said trash screen is mounted at least partly on said housings.

35. The apparatus of claim 1, claim 16 or claim 17 wherein said water tubes are straight-through tubes.

36. The apparatus of any one of claims 1, 2, 3, 4, 9, 17, 18, 19, 20, 21 or 22 wherein said hydromotive machines comprise hydraulic turbine generators.

37. The apparatus of any one of claims 1, 2, 3, 4, 9, 17, 18, 19, 20, 21 or 22 wherein said hydromotive machines comprise pumps.

38. A method of constructing a hydromotive machine apparatus in a water course site having retaining means therein, the apparatus comprising a bulkhead assembly having a plurality of hydromotive machines mounted thereon and the method comprising:
   at a fabrication site remote from the water course site fabricating the bulkhead assembly by connecting to each other a plurality of water tubes with their respective longitudinal axes parallel to each other so that respective opposite longitudial ends of the water tubes define, respectively, an upstream face and a downstream face and the water tubes cooperate to define a plurality of water flow paths extending from said upstream face to said downstream face;
   moving said bulkhead assembly from said fabrication site to said water course site and securing said bulkhead assembly to said retaining means; and
   mounting on said bulkhead assembly a plurality of hydromotive machines, each machine having a runner rotatably mounted thereon, the machines being mounted with their runners disposed within a respective one of the water flow paths.

39. The method of claim 38 wherein said water tubes individually comprise a distributor shroud and a draft tube and further including connecting a plurality of said draft tubes to each other to provide a draft module and thereafter attaching said distributor shrouds to said draft module to provide said bulkhead assembly.

40. The method of claim 38 including connecting said machines to said bulkhead assembly after said bulkhead assembly has been installed in said water course site.

41. The method of claim 38 wherein said hydromotive machines are submersible hydromotive machines.

42. The method of any one of claims 38, 39, 40 or 41 including mounting said hydromotive machines at the upstream face of said bulkhead assembly.

43. The method of any one of claims 38, 39, 40 or 41 wherein said hydromotive machines are hydraulic turbine generators.

44. The method of any one of claims 38, 39, 40 or 41 wherein said hydromotive machines are pumps.

45. The apparatus of claim 1, claim 16 or claim 17 wherein said hydromotive machines of claim 1 and claim 17 are hydraulic turbine generators, and including a transmission line electrically connecting a monitored group of said generators to a bus means, said transmission lines including circuit breakers which are responsive to the electrical condition of each of the generators of the monitored group to open the transmission line in response to electrical malfunction of one or more of the generators of the monitored group.

46. The apparatus of claim 45 including generator malfunction sensor means connecting each of the generators of the monitored group to the circuit breaker.

47. The apparatus of claim 45 wherein said apparatus comprises a plurality of the monitored group of said generators electrically connected to said bus means by an associated one of a plurality of said transmission lines.

48. The apparatus of claim 45 further including valve means associated with the monitored group of generators and valve control means operatively connected to the valve means to shut off water flow through the monitored group of generators in response to a malfunction of one or more of the generators of the monitored group.

49. The apparatus of claim 48 wherein said valve control means is responsive to said generator malfunction sensor means.

* * * * *

UNITED STATES PATENT AND TRADEMARK OFFICE
CERTIFICATE OF CORRECTION

PATENT NO. : 4,804,855

DATED : February 14, 1989

INVENTOR(S) : Henry K. Obermeyer

It is certified that error appears in the above-identified patent and that said Letters Patent is hereby corrected as shown below:

The title page showing the illustrative figure should be deleted to be replaced with the attached title page.

Signed and Sealed this

Tenth Day of March, 1992

Attest:

HARRY F. MANBECK, JR.

*Attesting Officer*   *Commissioner of Patents and Trademarks*

United States Patent [19]

Obermeyer

[11] Patent Number: 4,804,855

[45] Date of Patent: Feb. 14, 1989

[54] HYDROMOTIVE MACHINE APPARATUS AND METHOD OF CONSTRUCTING THE SAME

[76] Inventor: Henry K. Obermeyer, 36 Wickhams Fancy, Rivers Edge Rd., Collinsville, Conn. 06022

[21] Appl. No.: 76,044

[22] Filed: Jul. 21, 1987

Related U.S. Application Data

[63] Continuation-in-part of Ser. No. 14,440, Feb. 13, 1987, Pat. No. 4,755,690.

[51] Int. Cl.$^4$ .................................. F03B 13/10
[52] U.S. Cl. ................................. 290/54; 290/43
[58] Field of Search .................... 290/43, 52, 54; 405/78

[56] References Cited

U.S. PATENT DOCUMENTS

| | | | |
|---|---|---|---|
| 4,165,467 | 8/1979 | Atencio | 290/52 |
| 4,207,015 | 6/1980 | Atencio | 290/52 X |
| 4,289,971 | 9/1981 | Ueda | 290/52 |
| 4,319,142 | 3/1982 | Mayo, Jr. | 290/52 |
| 4,447,739 | 5/1984 | Ferguson et al. | 290/52 |
| 4,468,153 | 8/1984 | Gutierrez et al. | 290/52 X |

Primary Examiner—William M. Shoop, Jr.
Assistant Examiner—W. E. Duncanson, Jr.
Attorney, Agent, or Firm—Victor E. Libert

[57] ABSTRACT

A hydromotive machine apparatus comprises a bulkhead assembly comprised of an array of water tubes connected to each other with their longitudinal axes in parallel to provide the bulkhead as a relatively light and strong, truss-like integral unit providing a plurality of water flow paths through it. A plurality of submersible hydraulic electromotive machines, which may be generators and/or pumps, is mounted on the bulkhead assembly with runners of the machines disposed within respective water flow paths provided by the water tubes. The apparatus may include a trash screen mounted thereon, and/or valves associated with the water tubes to control the flow of water therethrough. The apparatus may be installed in a hydroelectric power installation by assembling it at a site remote from the water course operating site, for example, at an elevated position above the water level, and moving the apparatus, or at least the bulkhead assembly, as a unit to a submerged, operating position within a water course or passageway.

49 Claims, 14 Drawing Sheets

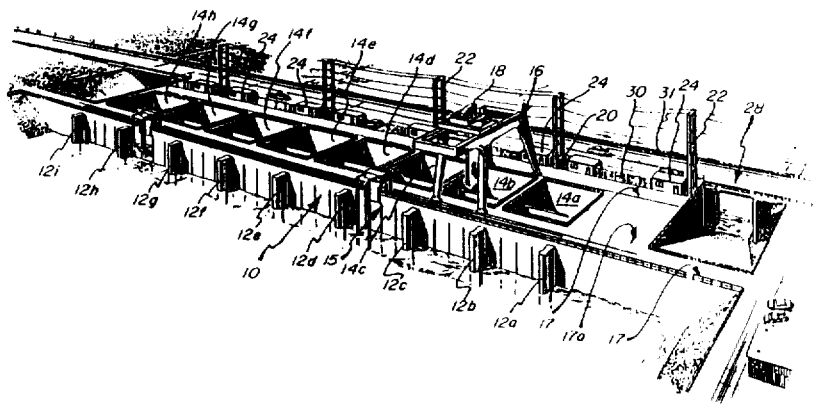

UNITED STATES PATENT AND TRADEMARK OFFICE
CERTIFICATE OF CORRECTION

PATENT NO. : 4,804,855

DATED : February 14, 1989

INVENTOR(S) : Henry K. Obermeyer

Page 3 of 8

It is certified that error appears in the above-identified patent and that said Letters Patent is hereby corrected as shown below:

In the Abstract, line 14, replace "hydroelectic" with --hydroelectric--.
In column 5, line 20, replace "2E" with --2F--; column 6, line 22, replace "greater" with --generator--; column 7, line 31, replace "1C" with --1B--; column 9, line 38, replace "2-2E" with --2E-2F--; column 10, line 59, replace "58b" with --59b--; column 11, line 44, replace "and" with --to--; column 12, line 19, replace "98, 100" with --100, 98--; column 12, line 31, replace "92a, 90b" with --90a, 92a--; column 12, line 38, replace "92a-94a" with --90a, 92a, 94a--; column 12, line 48, insert --will-- between "It" and "be"; column 13, line 22, replace "tier" with --tiers--; column 14, line 64, replace ", of," with --of--; column 14, line 66, insert --portion-- between "throat" and "164'"; column 15, line 13, replace "172b" with --172b'--; column 15, line 48, replace "1m" with --em--; column 18, line 3, insert --,-- between "206-2" and "etc.";

UNITED STATES PATENT AND TRADEMARK OFFICE
CERTIFICATE OF CORRECTION

PATENT NO. : 4,804,855

DATED : February 14, 1989

INVENTOR(S) : Henry K. Obermeyer

It is certified that error appears in the above-identified patent and that said Letters Patent is hereby corrected as shown below:

In the Drawings, add the three attached sheets of drawings containing, respectively, Figures 1, 6A and 6B, Figure 1B and Figure 2F; substitute the attached sheet containing Figures 2G and 3 for Sheet 6 of the Patent in order to correct Figure 3 of the Patent in which the gate opening 124a adjacent to operating rod 125 was omitted.